(12) United States Patent
Kanaoka et al.

(10) Patent No.: US 7,658,867 B2
(45) Date of Patent: Feb. 9, 2010

(54) MEMBRANE-ELECTRODE ASSEMBLY FOR SOLID POLYMER ELECTROLYTE FUEL CELL

(75) Inventors: Nagayuki Kanaoka, Saitama (JP); Masaru Iguchi, Saitama (JP); Hiroshi Sohma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 665 days.

(21) Appl. No.: 11/477,611

(22) Filed: Jun. 30, 2006

(65) Prior Publication Data

US 2007/0015024 A1    Jan. 18, 2007

(30) Foreign Application Priority Data

Jul. 15, 2005    (JP) .............................. 2005-206280

(51) Int. Cl.
    *H01B 1/00*    (2006.01)
    *H01M 8/10*    (2006.01)
    *B01J 49/00*   (2006.01)

(52) U.S. Cl. .................. 252/500; 429/33; 427/115; 521/27

(58) Field of Classification Search ............... 252/500; 429/33; 427/115; 521/27
    See application file for complete search history.

(56) References Cited

U.S. PATENT DOCUMENTS

2006/0083976 A1*  4/2006  Goddard et al. ............... 429/33

FOREIGN PATENT DOCUMENTS

| JP | 07-220741 A    | 8/1995  |
|----|----------------|---------|
| JP | 2001-342241 A  | 12/2001 |
| JP | 2002-293889 A  | 10/2002 |
| JP | 2003-113136 A  | 4/2003  |
| JP | 2004-137444 A  | 5/2004  |
| JP | 2004-345997 A  | 12/2004 |
| JP | 2004-346163 A  | 12/2004 |
| JP | 2004-346164 A  | 12/2004 |
| JP | 2005-036125 A  | 2/2005  |
| JP | 2005-060625 A  | 3/2005  |

\* cited by examiner

*Primary Examiner*—Mark Kopec
*Assistant Examiner*—Jaison P Thomas
(74) *Attorney, Agent, or Firm*—Arent Fox LLP.

(57) ABSTRACT

A membrane-electrode assembly for solid polymer electrolyte fuel cells, in which a sulfonic acid is an ion exchange group, and the heat resistance is superior, is provided. The membrane-electrode assembly for solid polymer electrolyte fuel cells contains a polymer including a principal chain that forms polyphenylene structure, a branched chain having a sulfonic acid group, and a branched chain having a nitrogen-containing heterocyclic group. It is preferred that a branched chain having a nitrogen-containing heterocyclic group is a structure expressed by the general formula (D) below.

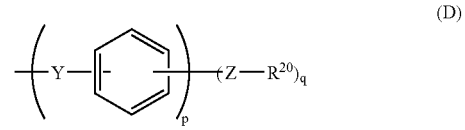

(D)

10 Claims, 1 Drawing Sheet

MEMBRANE-ELECTRODE ASSEMBLY FOR SOLID POLYMER ELECTROLYTE FUEL CELL

This application is based on and claims the benefit of priority from Japanese Patent Application No. 2005-206280, filed on 15 Jul. 2005, the content of which is incorporated herein by reference.

BACKGROUND OF THE INVENTION

1. Field of the Invention

The present invention relates to a solid polymer electrolyte membrane which enhances thermostability. In particular, the present invention relates a membrane electrode assembly for solid polymer electrolyte fuel cells having a polymer electrolyte membrane that improves the stability of a sulfonic acid group and power durability at high temperature when the membrane is employed as a proton conductive membrane contained in fuel cells.

2. Related Art

Fuel cells generate electric power by a process in which hydrogen gas, produced from various hydrocarbon fuels, such as natural gas, methane, and oxygen in the air, are electrochemically reacted to generate electric power directly. Therefore, they have been attracting attention as non-polluting power generating systems with higher efficiency, that can directly convert the chemical energy in fuels into electric energy.

A solid polymer electrolyte membrane-electrode assembly is typically employed in a fuel cell, in which the assembly is typically constructed of a pair of fuel electrode catalyst-supporting electrode membranes, which are a fuel electrode and an air electrode, as well as a proton-conductive electrolyte membrane (hereinafter sometimes referred to as a "solid polymer electrolyte membrane") that is disposed between the electrode membranes. The hydrogen gas turns into hydrogen ions and electrons by the action of the catalyst on the fuel electrode, and then the hydrogen ions travel through the solid polymer electrolyte membrane to be converted into water at the air electrode by a reaction with oxygen.

In recent years, fuel cells have been desired that provide a higher power generating performance. In order to enhance power generating, it is desired that the fuel cell be used at high temperatures. Therefore, it is desirable that the solid polymer electrolyte membrane-electrode assembly and be able to operate under a broader range of conditions, in particular, it is desirable that the membrane have higher proton conductivity at higher temperatures.

A polymer with a sulfonic acid group has usually been employed as the solid polymer electrolyte membrane, so as to satisfy the demands. In addition, the applicant suggests that a specific polymer having a sulfonic acid group be used as the proton conductive membrane that exhibits higher proton conductivity (see Patent Documents 1 to 3).

Patent Document 1: Japanese Unexamined Patent Application Laid-Open No. 2004-345997
Patent Document 2: Japanese Unexamined Patent Application Laid-Open No. 2004-346163
Patent Document 3: Japanese Unexamined Patent Application Laid-Open No. 2004-346164

However, there are problems with the conventional solid polymer electrolyte membrane formed from a polymer having a sulfonic acid group, in that a reversible elimination reaction is likely to occur on the sulfonic acid group or a cross-linking reaction may progress due to higher temperatures, which tends to decrease proton conductivity or embrittle the membrane, resulting in a possible decrease in the power output of the fuel cell or a shutdown in power generation due to a rupture in the membrane. In order to reduce the probability of these problems as much as possible, currently, the fuel cell is operated below a certain maximum temperature, which consequently results in a power generation output limit.

Accordingly, the solid polymer electrolyte membrane-electrode assembly in which a solid polymer electrolyte membrane exhibits superior thermal resistance while maintaining the proton conductivity at the prior level is desirable.

SUMMARY OF THE INVENTION

The present inventors have conducted extensive research in order to solve the problems described above, and have found that the problems may be solved by employing a solid polymer electrolyte membrane, in which a nitrogen-containing heterocyclic aromatic compound is introduced into a polymer having a sulfonic acid group, and thereby enhancing the high-temperature stability of the sulfonic acid group.

The membrane electrode assembly for solid polymer fuel cells is constructed as described below.

According to a first aspect of the invention, a membrane electrode assembly for the solid polymer electrolyte fuel cell, includes: an anode electrode; a cathode electrode; and a solid polymer electrolyte membrane; the anode electrode and the cathode electrode being disposed on opposite sides of the solid polymer electrolyte membrane; in which the solid polymer electrolyte membrane contains a polymer including a principal chain that forms a polyphenylene structure, a branched chain having a sulfonic acid group, and a branched chain having a nitrogen-containing heterocyclic group.

According to a second aspect of the invention, in the membrane electrode assembly for solid polymer electrolyte fuel cells as described in the first aspect of the present invention, the branched chain having a nitrogen-containing heterocyclic group is expressed by the general formula (D) below.

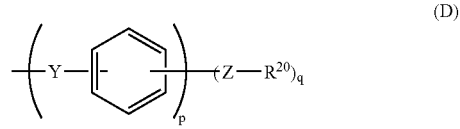

In the general formula (D), Z represents at least one structure selected from the group consisting of a direct bond, —O—, or —S—; Y represents at least one structure selected from the group consisting of —CO—, —SO$_2$—, —SO—, —CONH—, —COO—, —(CF$_2$)$_l$— (l is an integer of 1 to 10), and —C(CF$_3$)$_2$—; R$^{20}$ represents a nitrogen-containing heterocyclic group; q represents an integer of 1 to 5; p represents an integer of 0 to 4.

According to a third aspect of the present invention, in the membrane electrode assembly for solid polymer electrolyte fuel cells as described in the first aspect or the second aspect of the present invention, the nitrogen-containing heterocyclic group is at least one group induced by compounds selected from the group consisting of pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzthiazole, tetrazole, tetrazine, triazole, carbazole, acridine, quinoxaline, quinazoline, and derivatives thereof.

According to a fourth aspect of the present invention, in the membrane electrode assembly for solid polymer electrolyte fuel cells as described in the first aspect of the present invention, the branched chain having a sulfonic acid group is expressed by the general formula (E) below.

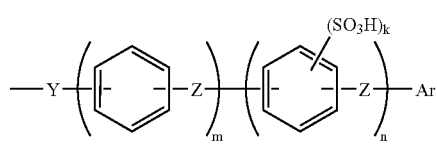

(E)

In the general formula (E), Y represents at least one structure selected from the group consisting of —CO—, —SO2—, —SO—, —CONH—, —COO—, —(CF$_2$)$_l$— (l is an integer of 1 to 10) and —C(CF$_3$)$_2$—; Z represents a direct bond, or at least a structure selected from the group consisting of —(CH$_2$)$_l$— (l is an integer of 1 to 10), —C(CH$_3$)$_2$—, —O— and —S—; Ar represents an aromatic group having a substituent expressed by —SO$_3$H, —O(CH$_2$)$_h$SO$_3$H or —O(CF$_2$)$_h$SO$_3$H; in which h is an integer of 1 to 12, m is an integer of 0 to 10, n is an integer of 0 to 10, and k is an integer of 1 to 4.

According to a fifth aspect of the present invention, the membrane electrode assembly for solid polymer electrolyte fuel cells as described in the first aspect of the present invention, includes constitutional units expressed by the general formulas (C) and (A) below.

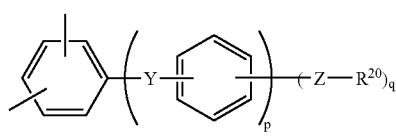

(C)

In the formula (C), Z represents at least one structure selected from the group consisting of a direct bond, —O— and —S—; Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—; R$^{20}$ represents a Nitrogen-containing heterocyclic group; q represents an integer of 1 to 5; p represents an integer of 0 to 4.

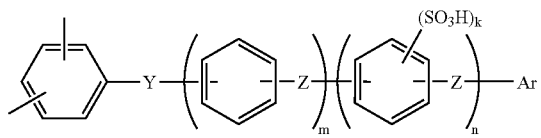

(A)

In the formula (A), Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—; Z represents at least one structure selected from the group consisting of a direct bond, —(CH$_2$)$_l$— (l is an integer of 1 to 10), —C(CH$_3$)$_2$—, —O— and —S—; Ar represents an aromatic group having a substituent expressed by —SO$_3$H, —O(CH$_2$)$_h$SO$_3$H or —O(CF$_2$)$_h$SO$_3$H; in which h is an integer of 1 to 12, m is an integer of 0 to 10, n is an integer of 0 to 10, and k is an integer of 1 to 4.

According to a sixth aspect of the present invention, the membrane electrode assembly for solid polymer electrolyte fuel cells as described in the fifth aspect of the present invention, further includes a constitutional unit expressed by the general formula (B) below.

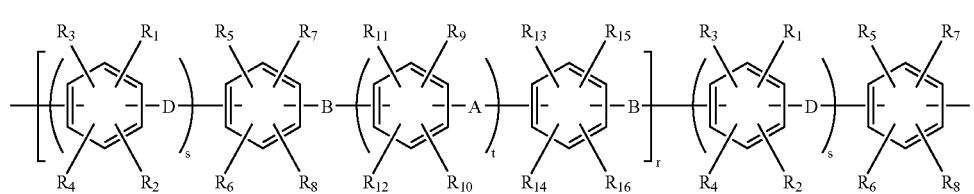

(B)

In the general formula (B), each of A and D is at least one structure independently selected from the group consisting of a direct bond, —CO—, —SO$_2$—, —SO—, —CONH—, —COO—, —(CF$_2$)$_l$— (l is an integer of 1 to 10), —(CH$_2$)$_l$— (l is an integer of 1 to 10); —CR'$_2$—(R' is an aliphatic hydrocarbon group, aromatic hydrocarbon group, or halogenated hydrocarbon group), cyclohexylidene group, fluorenylidene group, —O—, —S—; B is independently an oxygen or sulfur atom; R$^1$ to R$^{16}$, which may be identical or different from each other, represent at least one atom or group selected from a hydrogen atom, fluorine atom, alkyl group, partly or fully halogenated alkyl group, allyl group, aryl group, nitro group and nitrile group; s and t are integers of 0 to 4; r is an integer of 0 or more than 1.

According to a seventh aspect of the invention, the membrane electrode assembly for solid polymer electrolyte fuel cells as described in the fifth aspect of the present invention, includes 0.1 to 99.5 mol % of the structure expressed by the general formula (A), and 0.5 to 99.9 mol % of the structure expressed by the general formula (C).

According to a eighth aspect of the invention, in the membrane electrode assembly for solid polymer electrolyte fuel cells as described in the fifth aspect of the present invention, the rate of structures expressed by the general formula (A) to (C) is 0.001 to 50 mol %.

According to a ninth aspect of the invention, in the membrane electrode assembly for solid polymer electrolyte fuel cells as described in the first aspect of the present invention, the polymer has an ion exchange capacity of 0.3 to 5 meq/g.

According to a tenth aspect of the invention, in the membrane electrode assembly for solid polymer electrolyte fuel cells as described in the first aspect of the present invention, the polymer has a weight average molecular weight of 10,000 to 1,000,000.

In accordance with the present invention, a solid polymer electrolyte membrane may be provided, in which the sulfonic acid exhibits superior stability at higher temperatures without deteriorating proton conductivity of a polymer having excellent hot water resistance, higher concentrations of sulfonic acid and predominant proton conductivity, by introducing a nitrogen-containing heterocyclic aromatic group into the polymer. Accordingly, when the solid polymer electrolyte membranes are applied to membrane electrode assembly for solid polymer electrolyte fuel cells, electric power can be generated under a wide range of conditions of temperature and humidity, in particular at higher temperatures, and thus output of power generation can be raised significantly. In addition, a sulfonic acid group has higher stability at high temperature, so that fuel cells with much longer battery life can be provided.

DETAILED DESCRIPTION OF THE INVENTION

Figure 1:
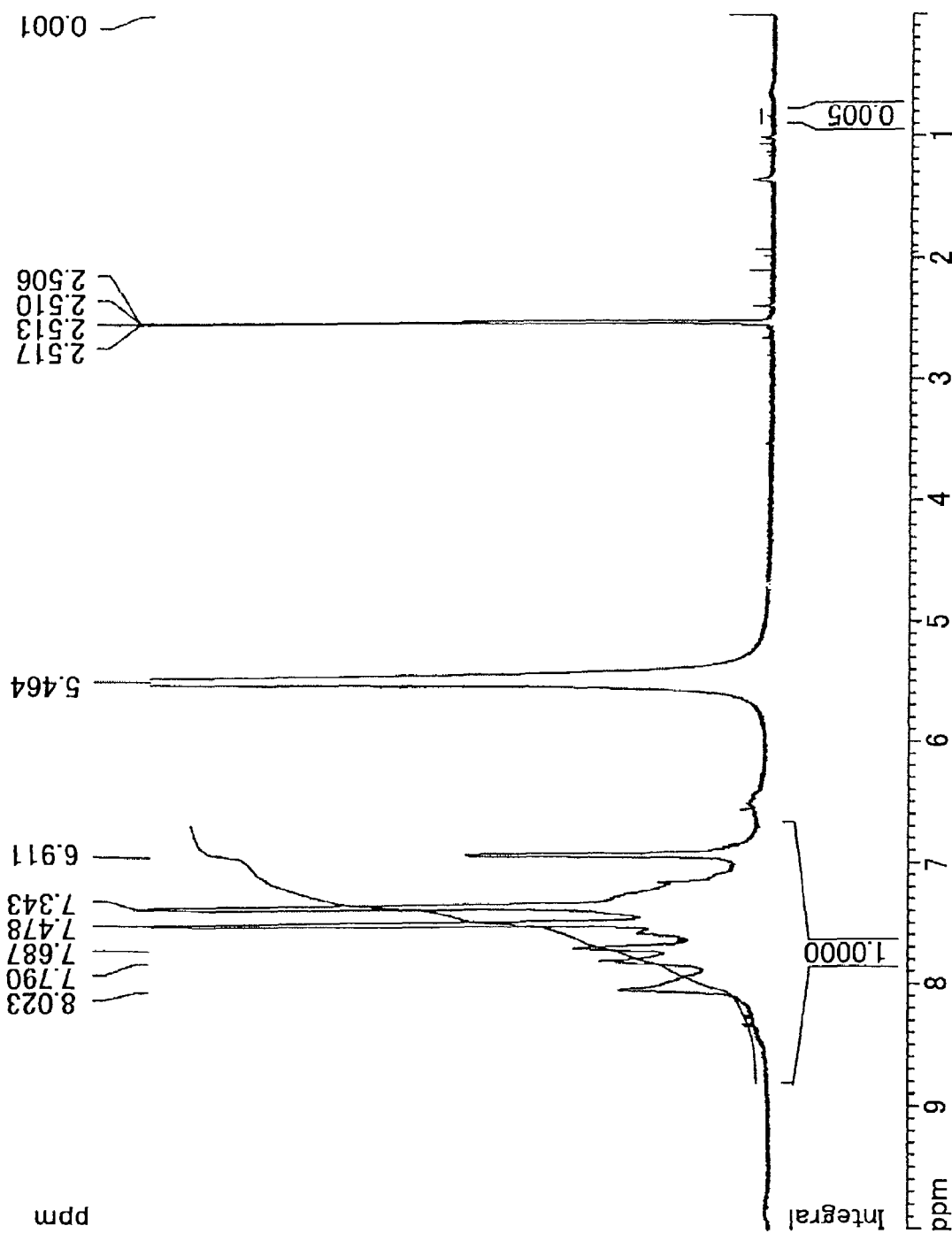
FIG. 1 shows $^1$H-NMR spectra of the compound obtained in Synthesis Example 1.

The best modes for carrying out the present invention will be explained in the following: The membrane electrode assembly for solid polymer electrolyte fuel cells according to the present invention is an electrode assembly having a solid polymer electrolyte membrane that contains a polymer in which a sulfonic acid group and a nitrogen-containing heterocyclic aromatic group are introduced.

Polymer

A Polymer used for the MEA of the present invention includes a principal chain that forms a polyphenylene group, a branched chain having a sulfonic acid group, and a branched chain having a nitrogen-containing heterocyclic group.

The principal chain that forms a polyphenylene structure represents the following structure, in which substituent $R^2$ represents the branched chain.

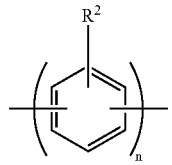

Branched Chain

In the present invention, the branched chain having a nitrogen-containing heterocyclic group is expressed by the general formula (D) below.

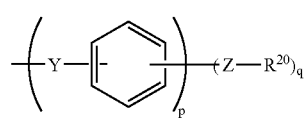

(D)

In the formula (D), Z represents at least one structure selected from the group consisting of a direct bond —O—, or —S—; Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—, preferably —CO—.

$R^{20}$ represents a nitrogen-containing heterocyclic group. The nitrogen-containing heterocyclic group is a group in the structure in which a hydrogen atom binding to a carbon atom or nitrogen atom in nitrogen-containing heterocyclic compounds and derivative thereof is extracted. Examples of the compounds include pyrrole, thiazole, isothiazole, oxazole, isoxazole, pyridine, imidazole, imidazoline, pyrazole, 1,3,5-triazine, pyrimidine, pyridazine, pyrazine, indole, chinoline, isoquinoline, purine, benzimidazole, benzoxazole, benzthiazole, tetrazole, tetrazine, triazole, carbazole, acridine, quinoxaline, and quinazoline. These nitrogen-containing heterocyclic groups may have substituent. Examples of the substituents include an alkyl group such as a methyl group, ethyl group, or propyl group; an aryl group such as a phenyl group, or toluyl group, naphthyl group; a cyano group; and a fluorine atom.

q represents integers of 1 to 5, preferably 1 or 2. p represents integers of 0 to 4, preferably 0 or 1.

In addition, the branched chain having a sulfonic acid group is expressed by the general formula (E) below.

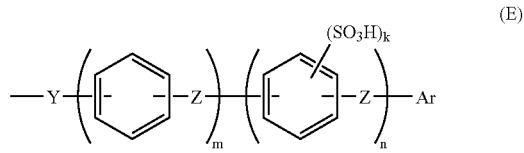

(E)

In the general formula (E), Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—. Among these, —CO— and —SO$_2$— are preferred.

Z represents a direct bond or at least one structure selected from the group consisting of —(CH$_2$)$_l$— (l is an integer of 1 to 10), —C(CH$_3$)$_2$—, —O— and —S—. Among these, the direct bond and —O— are preferred.

Ar represents an aromatic group having a substituent expressed by —SO$_3$H, —O(CH$_2$)$_h$SO$_3$H or —O(CF$_2$)$_h$SO$_3$H (h is an integer of 1 to 12).

Specific examples of the aromatic groups include phenyl, naphthyl, anthryl, and phenanthryl groups. Among these groups, phenyl and naphthyl groups are preferred. The aromatic group should have at least one substituent expressed by —SO$_3$H, —O(CH$_2$)$_h$SO$_3$H or —O(CF$_2$)$_h$SO$_3$H; preferably, the aromatic group has at least two substituents in the case in which the aromatic group is a naphthyl group.

m is an integer of 0 to 10, preferably 0 to 2; 'n' is an integer of 0 to 10, preferably 0 to 2; and 'k' is an integer of 1 to 4.

The preferable combinations of integers m and n, structures of Y, Z, and Ar are as follows:

(i) m=0, n=0; Y is —CO—, Ar is a phenyl group with a substituent of —SO$_3$H (ii) m=1, n=0; Y is —CO—, Z is —O—, and Ar is a phenyl group with a substituent of —SO$_3$H (iii) m=1, n=1, k=1; Y is —CO—, Z is —O—, and Ar is a phenyl group with a substituent of —SO$_3$H (iv) m=1, n=0; Y is —CO—, and Ar is a naphthyl group with two substituents of —SO$_3$H (v) m=1, n=0; Y is —CO—, Z is —O—, and Ar is a phenyl group with a substituent of —O(CH$_2$)$_4$SO$_3$H In branched chain (D) and (E) may be identical or different from each other.

Preferred Polymer

Polymers of the present invention preferably include constitutional units expressed by the general formulas (A) and (C).

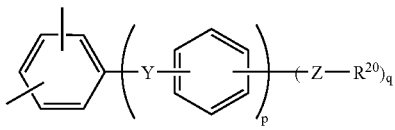

(C)

In the general formula (C), Y, Z, $R^{20}$, q, and p are the same as those defined in the general formula (D).

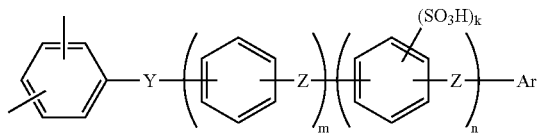
(A)

In the general formula (A), Y, Z, Ar, m, n, and k are the same as those defined in the general formula (E).

Furthermore, the polymer preferably include the constitutional unit expressed by the general formula (B).

hydrogen atom, fluorine atom, alkyl group, partly or fully halogenated alkyl group, allyl group, aryl group, nitro group and nitrile group.

Examples of the alkyl groups include methyl, ethyl, propyl, butyl, amyl, hexyl, cyclohexyl and octyl groups. Examples of the halogenated alkyl groups include trifluoromethyl, pentafluoroethyl, perfluoropropyl, perfluorobutyl, perfluoropentyl and perfluorohexyl groups. Examples of the allyl groups include propenyl group. Examples of the aryl groups include phenyl and pentafluorophenyl groups.

s and t are integers of 0 to 4. r is an integer of 0 or more than 1, the upper limit is usually 100, and it is preferably 1 to 80.

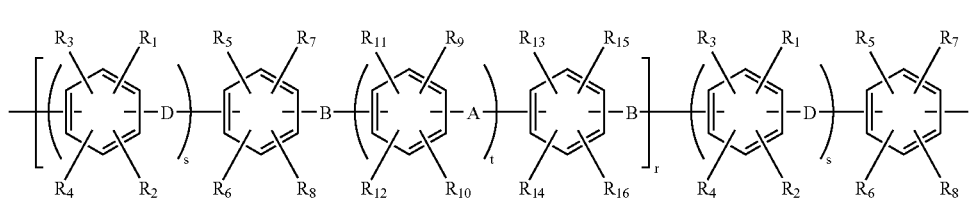
(B)

In the formula (B), A and D are at least one structure independently selected from the group consisting of a direct bond, —CO—, —$SO_2$—, —SO—, —CONH—, —COO—, —$(CF_2)_l$— (l is an integer of 1 to 10), —$(CH_2)_l$— (l is an integer of 1 to 10), —$CR'_2$—(R' is an aliphatic hydrocarbon group, aromatic hydrocarbon group, or halogenated hydrocarbon group) cyclohexylidene group, fluorenylidene group, —O—, —S—. Examples of structures expressed by —$CR'_2$—include a methyl group, ethyl group, propyl group, isopropyl group, butyl group, isobutyl group, t-butyl group, propyl group, octyl group, decyl group, octadecyl group, phenyl group, trifluoromethyl group.

Among these, a direct bond, —CO—, —$SO_2$—, or —$CR'_2$—(R' is an aliphatic hydrocarbon group, aromatic hydrocarbon group, or halogenated hydrocarbon group), cyclohexylidene group, fluorenylidene group, or —O—is preferred.

B represents independently an oxygen or sulfur atom, preferably an oxygen atom.

$R^1$ to $R^{16}$, which may be identical or different from each other, represent at least one atom or group selected from a Preferable combinations with respect to the integers of s and t and structures of A, B, D and $R^1$ to $R^{16}$ are as follows:

(i) s=1 and t=1, A is —$CR'_2$—, (R' is an aliphatic hydrocarbon group, aromatic hydrocarbon group, or halogenated hydrocarbon group), cyclohexylidene group, or fluorenylidene group, B is oxygen atom; D is a —CO—or —$SO_2$—, $R^1$ to $R^{16}$ is a hydrogen atom or fluorine atom;

(ii) s=1, t=0; B is oxygen atom; D is a —CO—or —$S_2$—, $R^1$ to $R^{16}$ is a hydrogen atom or fluorine atom;

(iii) s=0, t=1, A is —$CR'_2$—(R' is an aliphatic hydrocarbon group, aromatic hydrocarbon group, or halogenated hydrocarbon group), cyclohexylidene group, or fluorenylidene group, B is an oxygen atom; $R^1$ to $R^{16}$ is a hydrogen atom, fluorine atom, or nitrile group.

A Polymer used for the present invention include a constitutional (sulfonic acid) unit with a sulfonic acid group expressed by the general formula (A), a constitutional (hydrophobic) unit with no sulfonic acid groups expressed by the general formula (B), and a constructional (nitrogen-containing heterocyclic) unit with a nitrogen-containing heterocyclic group, which is expressed by the general formula (F).

(F)

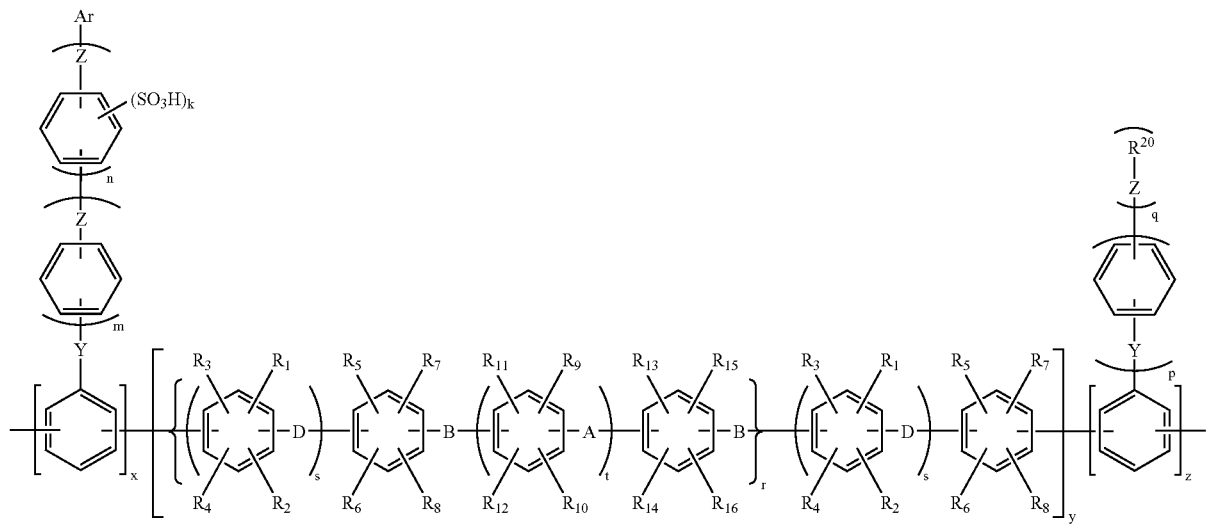

In the general formula (F), the meanings of A, B, D, Y, Z, Ar, k, m, n, p, q, r, s, t, $R^1$ to $R^{16}$, and $R^{20}$ are the same as those of A, B, D, Y, Z, Ar, k, m, n, p, q, r, s, t, $R^1$ to $R^{16}$, and $R^{20}$ in the general formulas (A), (B) and (C). x, y and z mean a mole ratio in which x+y+z=100 mole %.

The polymer used for the present invention includes 0.5 to 99.0 mol %, preferably 10 to 99.5% of a repeating constitutional unit (i.e. unit x) expressed by the formula (A), and 0.1 to 99.5 mol %, preferably 0.5 to 89.5 mol % of a repeating constitutional unit (i.e. unit z) expressed by the formula (C). The polymer optionally include 0.01 to 99.4 mol %, preferably 0.5 to 89.5 mol % of a repeating constitutional unit (i.e. unit y) expressed by the formula (B), accounting for the rest of the polymer except the units x and y.

In addition, the rate of a repeating constitutional unit expressed by the formula (A) to (C), (i.e. the x unit to the z unit) is 0.001 to 50 mol %, preferably 0.1 to 30 mol %, and more preferably 1 to 25 mol %.

Usually, the ion exchange capacity of the polymer used for the present invention is 0.3 to 5 meq/g, preferably 0.5 to 3 meq/g, more preferably 0.8 to 2.8 meq/g. When the ion-exchange capacity is less than 0.3 meq/g, the power generating performance is insufficient due to lower proton conductivity. On the other hand, when it is more than 5 meq/g, the water resistance may be remarkably degraded, so that it is not preferred.

The ion exchange capacity can be adjusted by changing the type, usage rate, or combination of the constitutional unit (A), (B), and (C). In other word, the ion exchange capacity can be adjusted by changing the ratio or type of starting precursors (e.g. monomers or oligomers) inducing the constitutional units (A), (B), and (C), when the polymer is synthesized.

Generally, the more the constitutional unit (A) is contained in the polymer, the higher the ion exchange capacity, but the lower the water resistance deteriorates. Therefore, the proton conductivity improves. Alternatively, the less the constitutional unit (A) is contained in the polymer, the higher the water resistance improves, but the lower the ion exchange capacity deteriorates. Therefore, the proton conductivity deteriorates.

Containing the constitutional unit (C) improves stability of sulfonic acid group at high temperature, so that the heat resistance of the polymer improves. The nitrogen atom in the nitrogen-containing heterocyclic aromatic compounds is basic, and thus interacts ionically with the sulfonic acid group. Consequently, the sulfonic acid group is stabilized and suppressed from detachment under higher temperatures. Furthermore, the cross-linking reaction due to the sulfonic acid group can be similarly suppressed between polymer molecules at higher temperatures. It is believed that the nitrogen-containing heterocyclic aromatic compounds have appropriate basic level to achieve these effects without deteriorating the proton conductivity.

The constitutional unit (B), which is an optional component of the polymer, accounts for the rest of the polymers except the constitutional units (A) and (B). However, the constitutional unit (B) needs not to be contained in the polymer. This constitutional unit (B) allows molecular weight of the polymer and the content of the above-mentioned constitutional units to adjust, as well as to obtain a polymer that exhibits thermally and chemically stable.

The polymer used for the present invention is a molecular weight of 10,000 to 1,000,000, preferably 20,000 to 800,000 based on polystyrene standard by gel permeation chromatography (GPC).

Method of Producing Polymer

The polymer having sulfonic acid may be produced, for example, by Method A, Method B, or Method C described below. Method A: In the same way as the method described in Japanese Patent Unexamined Laid-Open No. 2004-137444, monomers expressed by the formulas (A'), (B') and (C') are copolymerized to prepare a polymer with a sulfonic acid ester group. The sulfonic acid ester group is de-esterified to be substituted into a sulfonic acid group to synthesize the intended polymer.

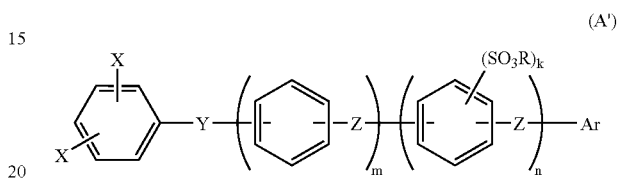

(A')

In the formula, X represents an atom or group selected from a chlorine atom, bromine atom or —$OSO_2Rb$, in which Rb represents an alkyl group or aryl group substituted with a fluorine atom. Y, Z, Ar, m, n, and k are the same as those in the general formula (A), and R represents an alkyl group with 4 to 12 carbons.

Examples of compounds expressed by the general formula (A') include compounds expressed by the general formula below and sulfonic acid esters described in Japanese Patent Unexamined Laid-Open Nos. 2004-137444, 2004-345997, and 2004-346163.

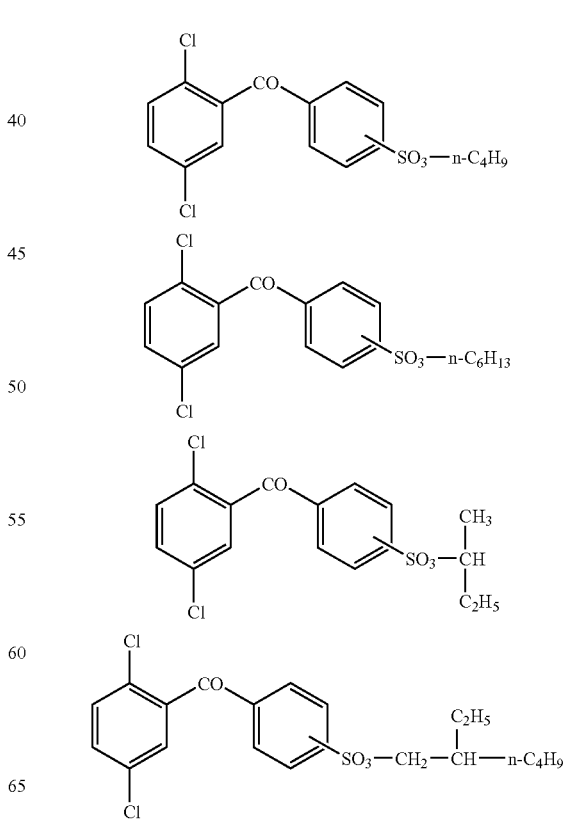

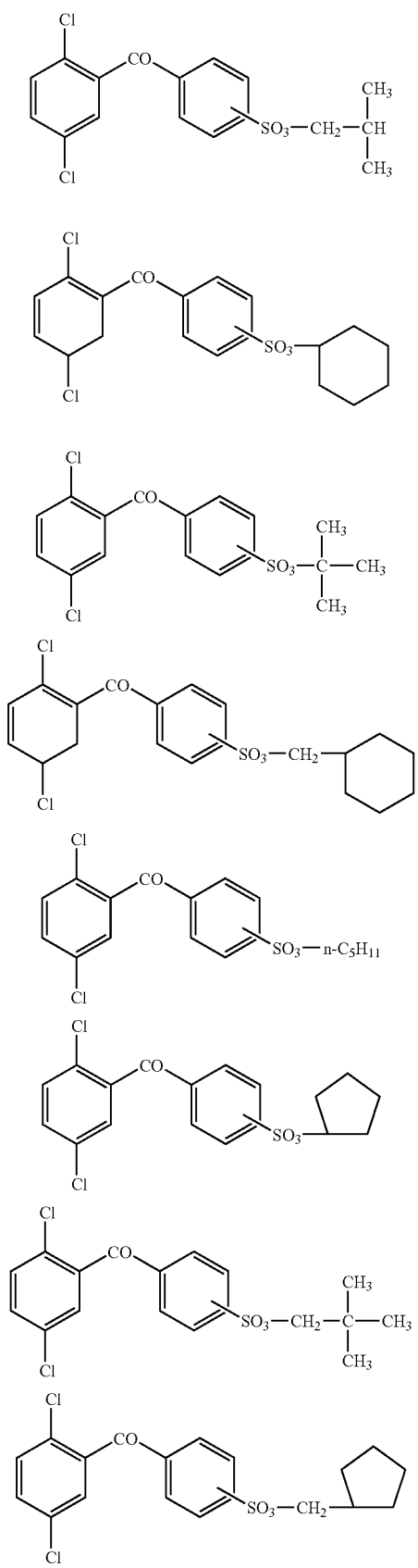
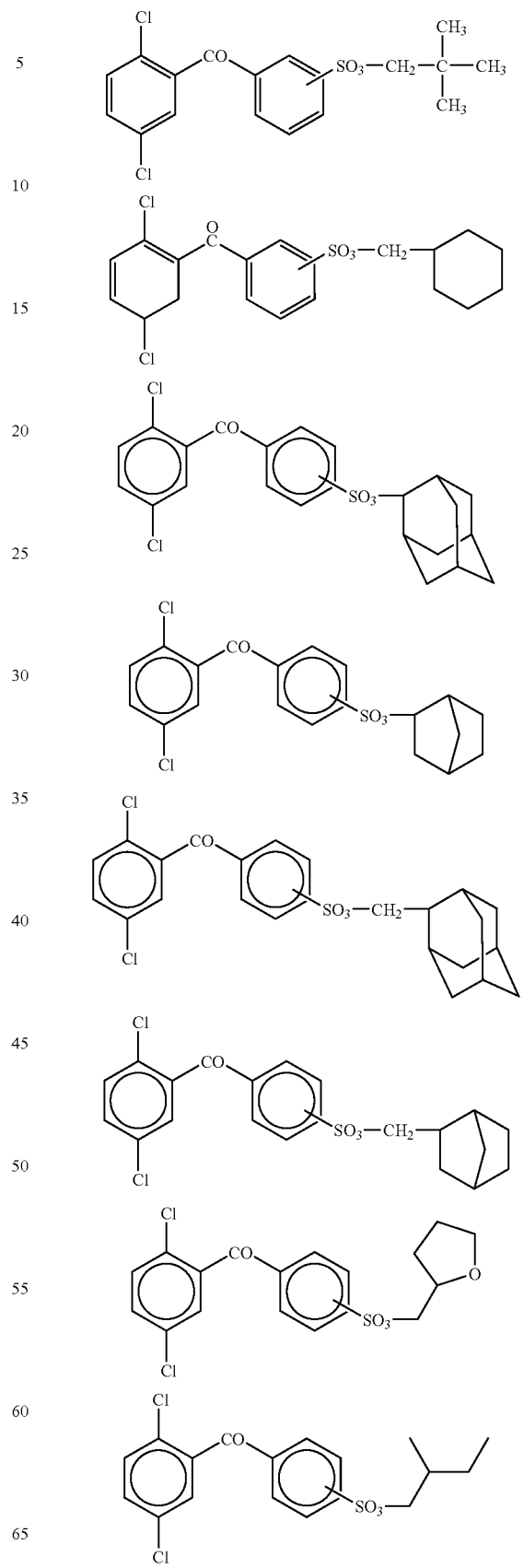

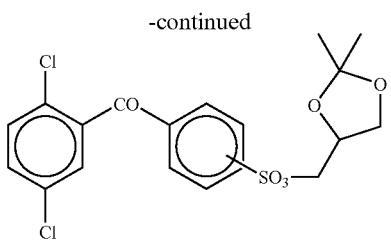

In the compounds expressed by the general formula (A'), the sulfonic acid ester is usually bound at the meta position of the aromatic ring in structure.

In the formula, R' and R" represent an atom or group selected from a chlorine atom, bromine atom or —OSO$_2$Rb, in which Rb represents an alkyl group or aryl group substituted with a fluorine atom. $R^1$ to $R^{16}$, A, B, D, s, t and r are the same as those in the general formula (B).

Examples of compounds expressed by the general formula (B'), in the case in which r=0, include 4,4'-dichlorobenzophenone, 4,4'-dichlorobenzanilide, 2,2-bis(4-chlorophenyl)difluoromethane, 2,2-bis(4-chlorophenyl)-1,1,1,3,3,3-hexafluoropropane, 4-chlorobenzoic acid-4-chlorophenylester, bis(4-chlorophenyl)sulfoxide, bis(4-chlorophenyl)sulfone, and 2,6-dichlorobenzonitrile. The compounds listed above, of which the chlorine atom is replaced with a bromine or iodine atom, may be used.

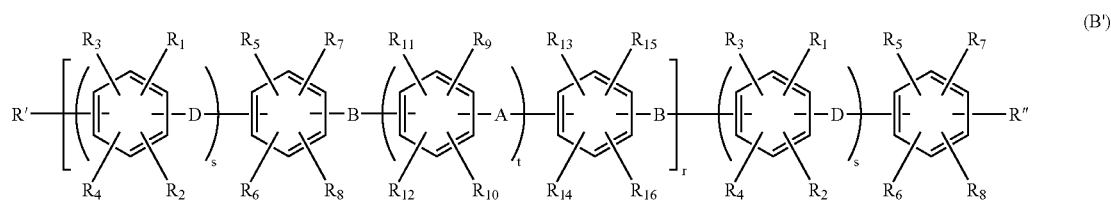

In addition, examples of the compounds expressed by the general formula (B'), in the case in which r=1, described in Japanese Patent Unexamined Laid-Open No. 2003-113136.

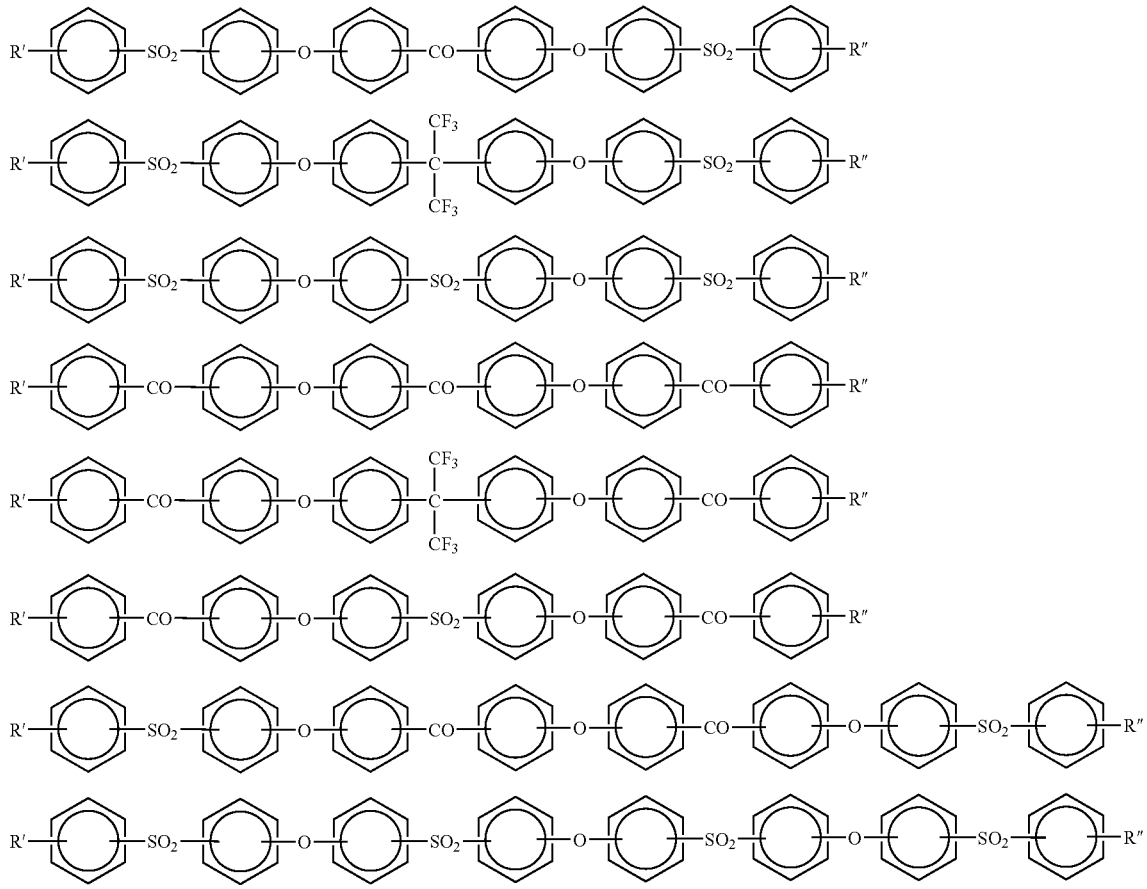

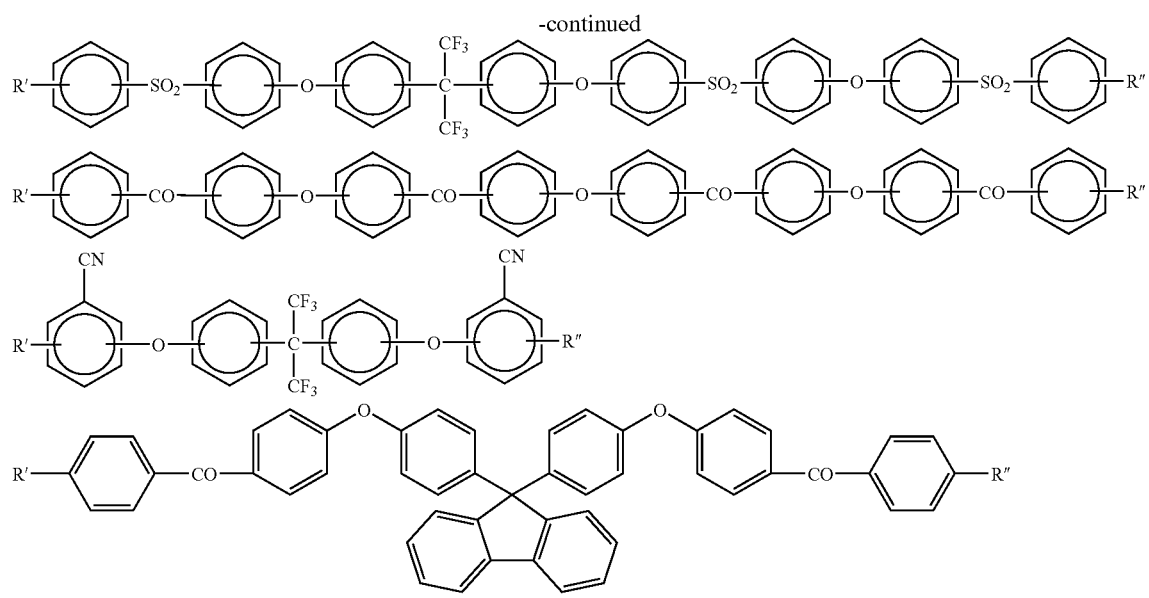
In addition, examples of the compounds expressed by the general formula (B'), in the case in which r is more than 2, include compounds in structures below.
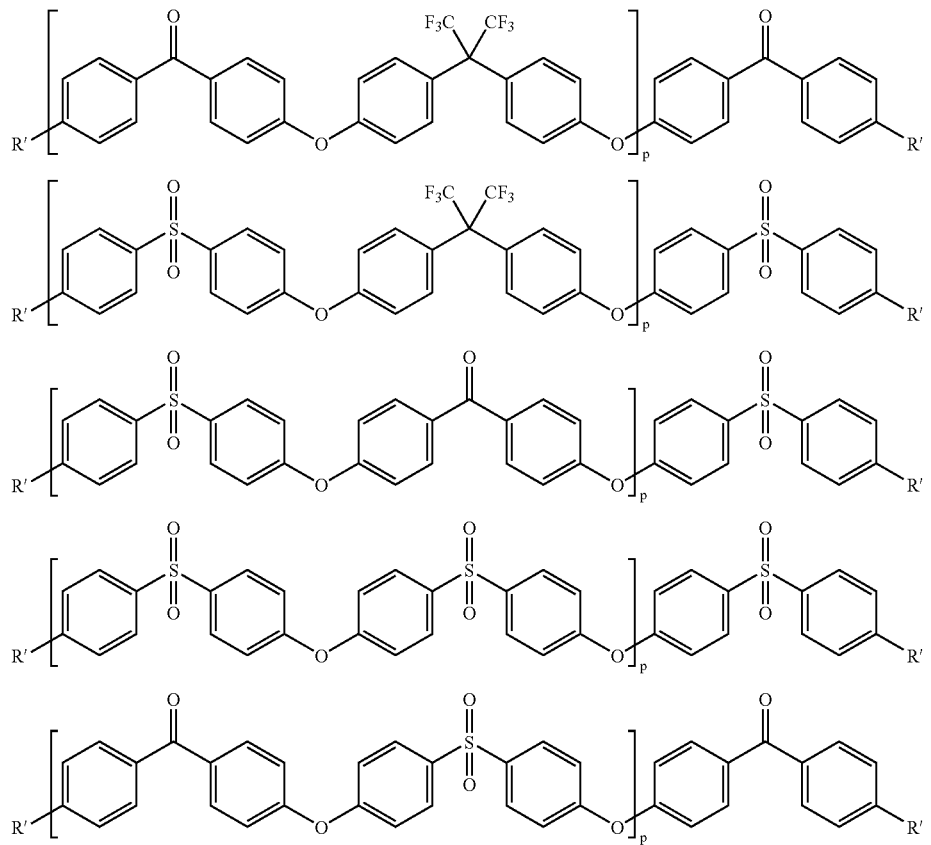
(C')

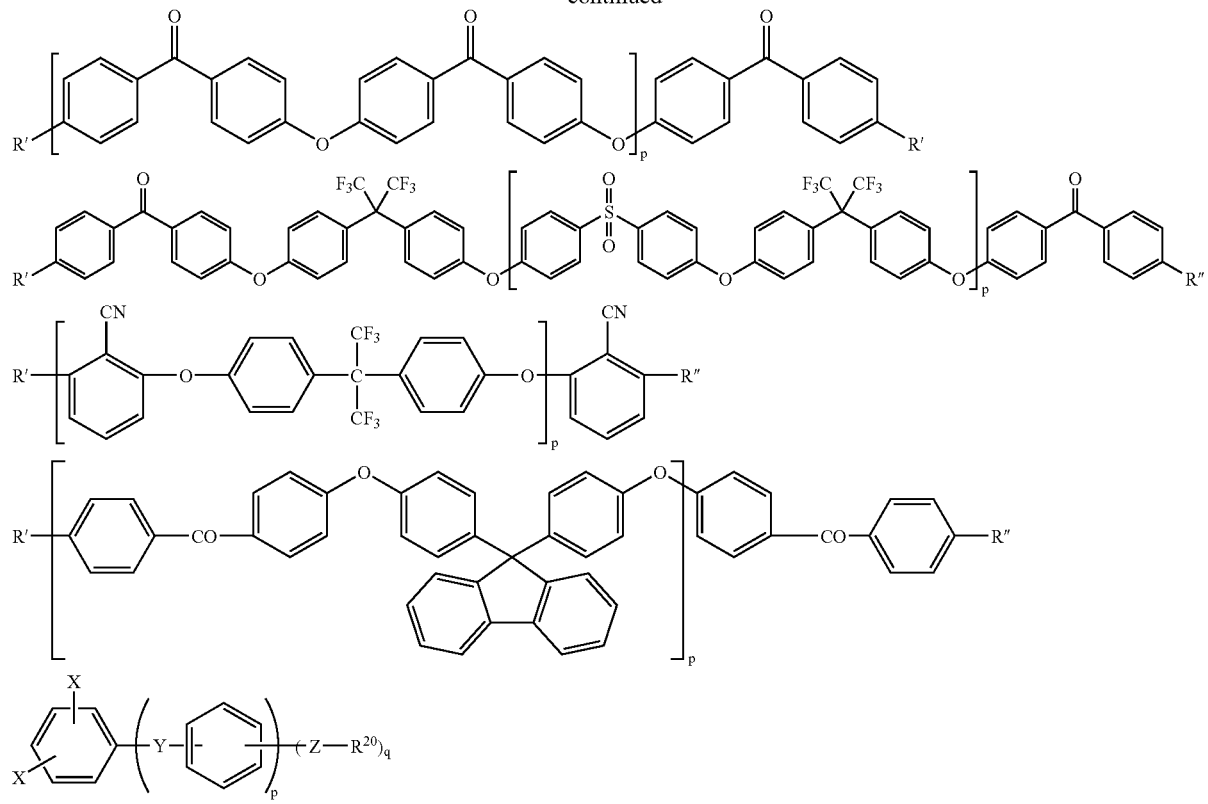
In the formula, X represents an atom or group selected from a chlorine atom, bromine atom or —OSO$_2$Rb, in which Rb represents an alkyl group or aryl group substituted with a fluorine atom. Y, Z, R$^{20}$, p and q are the same as those in the general formula (C).
Examples of compounds expressed by the general formula (C') include the compounds below.
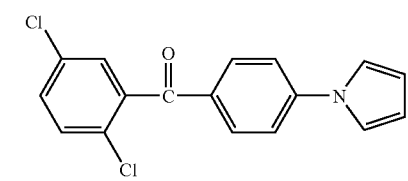
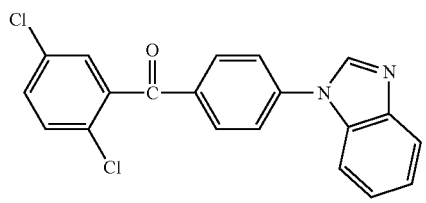
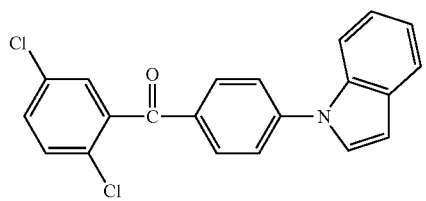
-continued
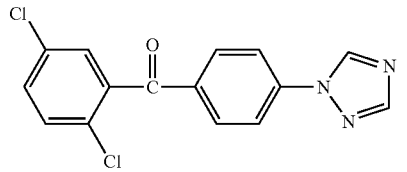
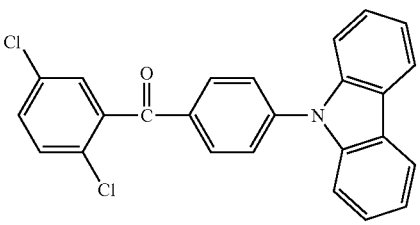
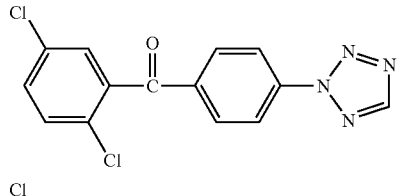

-continued

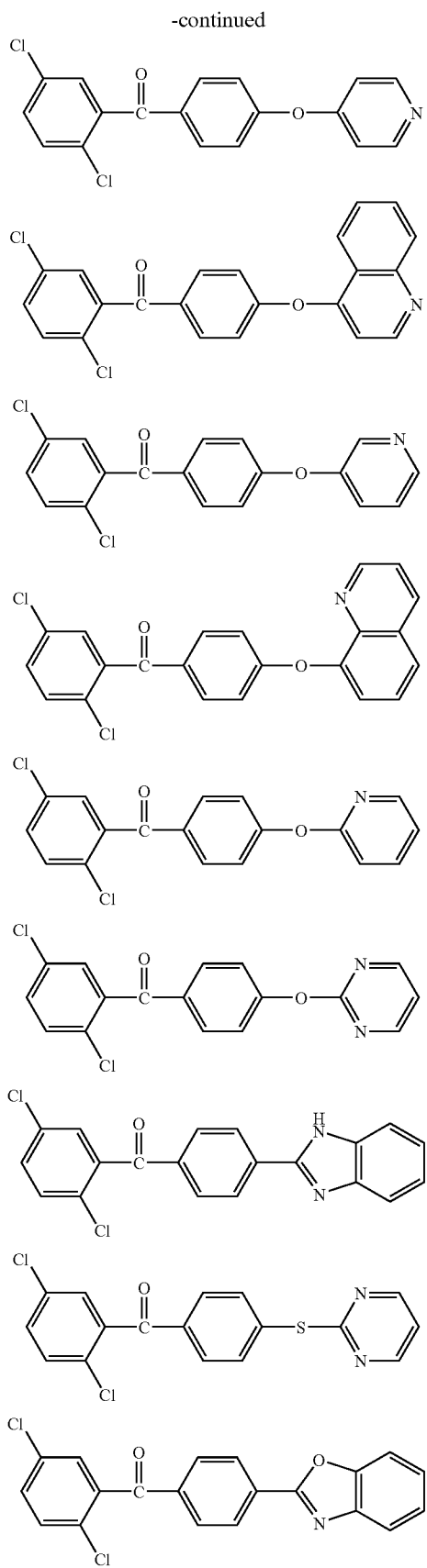

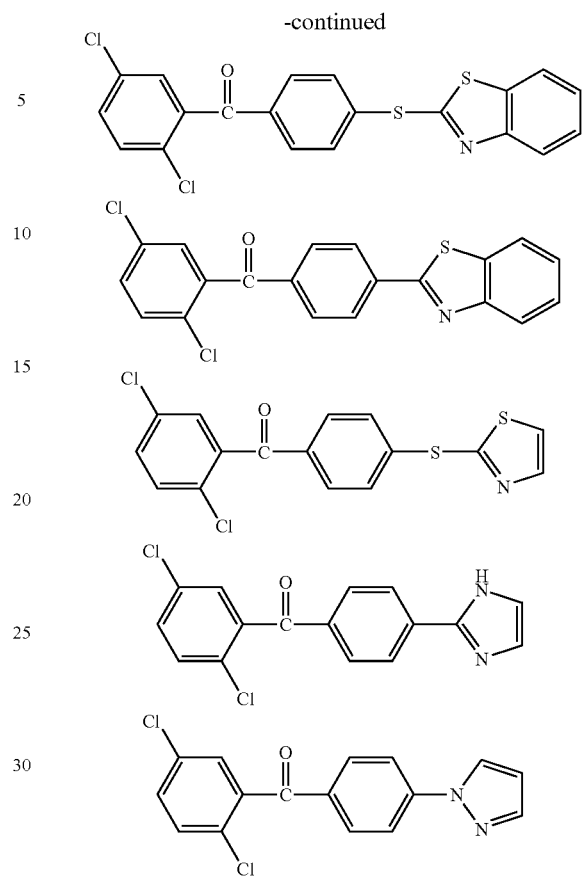

Furthermore, the compounds include compounds in which a chlorine atom is replaced with a bromine atom, and isomers in which the binding positions with a chlorine atom or bromine atom are varied. In addition, the compounds include compounds in which a —CO— bond is replaced with a —SO$_2$— bond. These compounds may be used alone or in combination.

An example of methods for synthesizing a polymer expressed by the general formula (C') include a method to nucleophilically substitute a compound expressed by the general formula (2) with a nitrogen-containing heterocyclic compound.

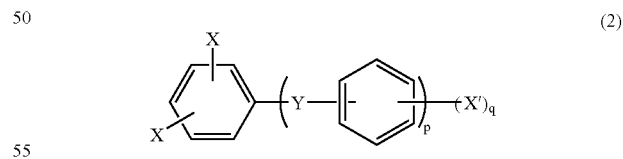

(2)

In the formula, X, Y, p and q are the same as described in the general formula (C'). X' represents a halogen atom, preferably a fluorine atom or chlorine atom, more preferably a fluorine atom.

Examples of compounds expressed by the general formula (2), include: 2,4-dichloro-4'-fluorobenzophenone, 2,5-dichloro-4'-fluorobenzophenone, 2,6-dichloro-4'-fluorobenzophenone, 2,4-dichloro-2'-fluorobenzophenone, 2,5-dichloro-2'-fluorobenzophenone, 2,6-dichloro-2'-fluorobenzophenone, 2,4-dichlorophenyl-4'-fluorophenylsulfone, 2,5-dichlorophenyl-4'- fluorophenylsulfone, 2,6-dichlorophenyl-4'-fluorophenylsulfone, 2,4-dichlorophenyl-2'-fluorophenylsulfone, 2,4-dichlorophenyl-2'-fluorophenylsulfone, 2,4-dichlorophenyl-2'-fluorophenylsulfone. Among these, 2,5-dichloro-4'-fluorobenzophenon is preferred.

A nitrogen-containing heterocyclic compound, which has an active hydrogen, is used for substituting the active hydrogen with group X' in the compound expressed by the general formula (2).

Examples of nitrogen-containing heterocyclic compounds include: Pyrrole, thiazole, isothiazole, oxazole, isoxazole, pyridine, imidazole, imidazoline, pyrazole, 1,3,5-triazine, pyrimidine, pyridazine, pyrazine, indole, chinoline, isoquinoline, purine, benzimidazole, benzoxazole, benzthiazole, tetrazole, tetrazine, triazole, carbazole, acridine, quinoxaline, quinazoline, 2-hydroxypyridine, 3-hydroxypyridine, 4-hydroxypyridine, 3-hydroxyquinoline, 8-hydroxyquinoline, 2-hydroxypyrimidine, 2-mercaptopyridine, 3-mercaptopyridine, 4-mercaptopyridine, 2-mercaptopyrimidine, and 2-mercaptobenzthiazole.

Among these compounds, pyrrole, imidazole, indole, carbazole, benzoxazole, or benzimidazole are preferred.

It is preferred that a compound expressed by the general formula (2) be reacted with a nitrogen-containing heterocyclic compound having an active hydrogen in organic solvent. Polar solvent such as N-carbinyl-2-pyrrolidone, N,N-dimethylacetamide, sulfolane, diphenylsulphone, and dimethylsulfoxide may be used. Alkaline metals, or hydrides and hydroxides thereof, hydroxylation alkaline metals, and alkali metal carbonate may be used so as to promote the reaction. When a compound expressed by the general formula (2) is reacted with a nitrogen-containing heterocyclic compound having an active hydrogen, the amount of the former is used as same as the latter, or less than the latter. Specifically, the amount of a nitrogen-containing heterocyclic compound having an active hydrogen is used at 1 to 3 times mole, in particular, 1 to 1.5 times mol of the amount of the compound expressed by the general formula (2) for the reaction.

The reaction temperature is 0 to 300 degrees C., preferably 10 to 200 degrees C. The reaction period is 15 minutes to 100 hours, preferably 1 to 24 hours.

It is preferred that the product be refined, preferably recrystallized for use.

Polymerization

To obtain a polymer used for the present invention, the monomers (A'), (C'), and (B'), if necessary, are first copolymerized to obtain precursors.

This copolymerization is conducted in the presence of catalyst. The available catalysts contain a transition metal compound; the catalysts contain essentially (i) a transition metal salt and a ligand compound (hereinafter sometimes referred to as "ligand component"), or a transition metal complex with a coordinate ligand (including copper salt) and (ii) a reducing agent, and additionally an optional "salt" in order to increase the polymerization reaction rate.

The specific examples of the catalyst components, contents of respective components in use, reaction solvent, concentration, temperature, period and the like in the reaction are illustrated in Japanese Unexamined Patent Application Laid-Open No. 2001-342241.

For transition metal salts, nickel chloride and nickel bromide are preferably used. For ligand compounds, triphenylphosphine, tri-o-tolylphosphine, tri-m-tolylphosphine, tri-p-tolylphosphine, tributylphosphine, tri-tert-butylphosphine, trioctylphosphine, and 2,2'-bipyridine are preferably used. Examples of transition metal (salt) with a coordinated ligand include nickel chloride bis(triphenylphosphine) and nickel chloride (2,2'-bipyridine). Examples of reducing agents include iron, zinc, manganese, aluminum, magnesium, sodium and potassium; preferable are zinc, magnesium and manganese. Preferable examples of the "salt" include sodium bromide, sodium iodide, potassium bromide, tetraethyl ammonium bromide and tetraethyl ammonium iodide. A solvent may be employed in the reaction; specific examples thereof include tetrahydrofuran, N,N-dimethylformamide, N,N-dimethylacetamide and 1-methyl-2-pyrrolidone. The usage rage of each component in catalyst, transition metal salt or transition metal (salt) with a coordinated ligand is usually 0.0001 to 10 mol, preferably 0.01 to 0.5 mol, based on one mole of the entire monomers. In this range, the polymerization can be conducted on conditions of higher catalytic activity and molecular weight. In a case in which "salts" are utilized with the catalysts, the amount of the salts is usually 0.001 to 100 moles, preferably 0.01 to 1 mole based on one mole of the entire monomers. In this range, rate of polymerization effectively increases. The concentration of the entire monomers in the solvent is usually 1 to 90 mass %, preferably 5 to 40 mass %. In addition, polymerization temperature when the polymer of the present invention is polymerized is usually 0 to 200 degrees C., preferably 50 to 100 degrees C. In addition, polymerization period is usually 0.5 to 100 hours, preferably 1 to 40 hours.

Subsequently, the resulting polymer is hydrolyzed, and a sulfonic acid group ($-SO_3R$) in a constitutional unit is converted to a sulfonic acid group ($-SO_3H$). The hydrolysis is conducted by the following methods:

(i) a polymer having a sulfonic ester group is poured into an excess amount of water or alcohol containing a small amount of HCl and the mixture is stirred for no less than 5 minutes;

(ii) a polymer having a sulfonic ester group is reacted in trifluoroacetic acid at 80 to 120 degrees C. for 5 to 10 hours;

(iii) a polymer having a sulfonic ester group is reacted at 80 to 150 degrees C. for about 3 to 10 hours within solvent such as N-methylpyrrolidone that contains lithium bromide of 1 to 3 times mole based on the amount of sulfonic ester group ($-SO_3R$) of the polymer, then HCl is added to the reaction mixture.

Method B: A monomer, having a skeleton expressed by the general formula (A') and having neither sulfonic acid group nor sulfonic ester group, and monomers expressed by the general formulas (B) and (C) are copolymerized in accordance with the method described in Japanese Unexamined Patent Application Laid-Open No. 2001-342241, for example, and then the resulting polymer is sulfonated by use of a sulfonating agent, and thereby a polymer having a sulfonic acid group can be synthesized.

Specific examples of monomers used in the Method B, which are capable of forming the constitutional unit expressed by the general formula (A), having neither sulfonic acid group nor sulfonic ester group, include the dihalogenated compounds described in Japanese Unexamined Patent Application Laid-Open Nos. 2001-342241 and 2002-293889.

Method C: In a case in which Ar is an aromatic group having a substituent expressed by $-O(CH_2)pSO_3H$ or $-O(CF_2)pSO_3H$ in the general formula (A), a precursor monomer capable of forming the constitutional unit expressed by the general formula (A), a monomer or oligomer capable of forming the constitutional unit expressed by the general formula (B), a monomer capable of forming the constitutional unit expressed by the general formula (C) are copolymerized in accordance with the method described in Japanese Unexamined Patent Application Laid-Open No. 2005-

60625, for example, and then an alkylsulfonic acid or fluorinated alkylsulfonic acid is introduced.

Specific examples of precursor monomers, utilized in Method C, capable of constituting the constitutional unit expressed by the general formula (A), include the dihalogenated compounds described in Japanese Unexamined Patent Application Laid-Open No. 2005-36125, specifically, 2,5-dichloro-4'-hydroxybenzophenone, 2,4-dichloro-4'-hydroxybenzophenone, 2,6-dichloro-4'-hydroxybenzophenone, 2,5-dichloro-2',4'-dihydroxybenzophenone, and 2,4-dichloro-2', 4'-dihydroxybenzophenone. The compounds of which the hydroxyl group is protected by the tetrahydropyranyl group or the like may also be used. The compounds of which the hydroxyl group is replaced by thiol group or of which the chlorine atom is replaced with a bromine atom or iodine atom may also be used.

In addition, when the precursor of the polymer does not have any sulfonic acid group in Method C, alkylsulfonic acid group is introduced by the method described in Japanese Patent Unexamined Laid-Open No. 2005-60625. In the Method C, the introduction may be attained through reacting the hydroxyl group of the precursor polymer with propanesultone, butanesultone or the like.

Proton Conductive Membrane

A proton conductive membrane according to the present invention consists of a polymer having the sulfonic acid group and the nitrogen-containing heterocyclic group.

A method to produce a proton conductive membrane according to the present invention includes a casting process in which a polymer of the present invention is dissolved into organic solvent, the resulting solution is cast, followed by drying and removing the solvent to form a membrane; however, it is not limited in particular.

The substrate used in the membrane-forming process may be properly selected from those used in conventional solution-casting processes without particular limitations; for example, the substrate may be of plastics or metals, preferably the substrate is of thermoplastic resins such as polyethylene terephthalate (PET) films.

Examples of the solvents usable in the method for producing the membrane include aprotic polar solvents such as N-methyl-2-pyrrolidone, N,N-dimethylformamide, Y-butyrolactone, N,N-dimethylacetamide, dimethylsulfoxide, dimethylurea and dimethylimidazolizinone. Among these, N-methyl-2-pyrrolidone (hereinafter sometimes referred to as "NMP") is preferred in particular from the viewpoint of solubility and solution viscosity. These aprotic polar solvents may be used alone or in combination.

The solvent may be a mixture of the aprotic polar solvent and an alcohol. Examples of the alcohols include methanol, ethanol, propyl alcohol, isopropyl alcohol, sec-butyl alcohol and tert-butyl alcohol. Among these, methanol is preferred since it can reduce the viscosity over a wider range of compositions. These alcohols may be used alone or in combination.

When the mixture of the aprotic polar solvent above and the alcohol is employed, the content of the aprotic polar solvent is 25 to 95 mass %, preferably 25 to 90 mass %, and the content of the alcohol is 5 to 75 mass %, preferably 10 to 75 mass %, with the provision that the total is 100 mass %. The content of the alcohol within range may provide a superior effect to decrease the solution viscosity.

In addition to these alcohols, inorganic acids such as sulfuric acid and phosphoric acid, organic acids such as carboxylic acids or a proper amount of water may be incorporated together.

The concentration of the polymer in the solution for producing the membrane is typically 5 to 40 mass %, preferably 7 to 25 mass %. When the polymer concentration is less than 5 mass %, thicker membrane is difficult to be obtained, and pinholes tend to occur. On the other hand, when the polymer concentration is more than 40 mass %, the solution viscosity is too high to form a film properly, and also the surface smoothness may be deteriorated.

The solution viscosity is typically 2,000 to 100,000 mPa·s, and preferably 3,000 to 50,000 mPa·s. When the solution viscosity is less than 2,000 mPa·s, the retaining property of the solution is likely to be insufficient during the film-forming process, and thus the solution sometimes flows out of the substrate, and when the solution viscosity is more than 100,000 mPa·s, the viscosity is too high to extrude the solution from a die, and thus the film is difficult to be produced by means of flowing process.

The resulting non-dried film is immersed into water after the film is produced, thereby the organic solvent in the non-dried film can be replaced with water, and the residual solvent can be reduced within the proton conductive membrane. The non-dried film may be pre-dried before immersing them into water. The pre-drying is typically carried out in a condition of 50 to 150 degrees C. for 0.1 to 10 hours.

When the non-dried film (hereinafter including "pre-dried film") is immersed into water, the film piece may be immersed into water in a batch method; alternatively, a continuous method may be carried out such that an intact laminate film formed on a substrate film, e.g., PET or a membrane separated from the substrate, is immersed into water and wound up successively. In the batch process, it is preferred that the non-dried film be fitted into a frame and then immersed into water so as to prevent wrinkles on the surface of the film after the processing.

The amount of water utilized when immersing the non-dried films is 10 weight parts or more, preferably 30 weight parts or more, more preferably 50 weight parts or more based on one weight part of the non-dried film. When the amount of water is in range, the amount of solvent that remains within the resulting proton conductive membrane may be reduced. In addition, the concentration of organic solvent is maintained at or under a certain level, to effectively reduce the amount of solvent that remains within the resulting solid polymer electrolyte membrane, for example, when the water used for immersion is exchanged or overflowed. Furthermore, the concentration of the organic solvent in the water is effectively homogenized by stirring, for example, in order to reduce the two-dimensional distribution of residual organic solvent within the proton conductive membrane.

The temperature of water, in which the non-dried film is immersed into water, is typically 5 to 80 degrees C., preferably 10 to 60 degrees C. from the viewpoint of replacing rate and easy handling. The higher the temperature, the higher the rate to replacement of the organic solvent with water and the higher the absorption of the film; however, the surface of the proton conductive membrane may be deteriorated after drying. The immersing period of film depends on the initial content of residual solvent, amount of water used, and processing temperature; in which the period is typically 10 minutes to 240 hours, preferably 30 minutes to 100 hours.

After immersing the non-dried film into water as described above, the film is dried at 30 to 100 degrees C., preferably at 50 to 80 degrees C. for 10 to 180 minutes, preferably for 15 to 60 minutes, then are dried at 50 to 150 degrees C., preferably under reduced pressure of 500 mmHg to 0.1 mmHg for 0.5 to 24 hours, and thereby the proton conductive membrane may be obtained.

In the resulting proton conductive membrane, the content of the residual solvent is typically reduced to 5 mass % or less, preferably to 1 mass % or less.

The thickness of the resulting proton conductive membranes is typically 10 to 100 μm, preferably 20 to 80 μm in the dried condition.

Electrode

The catalyst used for the present invention is preferably a supported catalyst in which platinum or platinum alloy is supported on a porous carbon material. A carbon black or activated carbon may be used for the porous carbon material. Examples of the carbon blacks include a channel black, a furnace black, a thermal black, and an acetylene black; the activated carbons may be those produced through carbonizing and activating various carbon-containing materials.

The catalysts formed by supporting the platinum or a platinum alloy on a carbon carrier may be used. The platinum alloy may afford stability and activity as an electrode catalyst. Preferably, platinum alloys are used which are formed from platinum and at least a metal selected from platinum group metals other than platinum (i.e., ruthenium, rhodium, palladium, osmium or iridium), or metals of other groups such as cobalt, iron, titanium, gold, silver, chrome, manganese, molybdenum, tungsten, aluminum, silicon, rhenium, zinc or tin; and the platinum alloys may include an intermetallic compound which is formed of platinum and other metals alloyable with platinum.

Preferably, the supported content of the platinum or platinum alloy (i.e. mass % of platinum or platinum alloy on the basis of the overall mass of catalyst) is 20 to 80 mass %, and in particular 30 to 55 mass %, since the range may provide higher output power. However, when the supported content is less than 20 mass %, sufficient output power may not be attained, and when over 80 mass %, the particles of platinum or platinum alloy may not be supported on the carrier of carbon material with sufficient dispersibility.

The primary particle size of the platinum or platinum alloy is preferably 1 to 20 nm so as to obtain highly active gas-diffusion electrodes. In particular, the primary particle size is preferably 2 to 5 nm to ensure the platinum and platinum alloy have a larger surface area from the viewpoint of reaction activity.

The catalyst layers in the present invention include, in addition to the supported catalyst, an ion conductive polymer electrolyte or ion conductive binder that contains a sulfonic acid group. Usually, the supported catalysts are covered with the electrolyte, and thus a proton ($H^+$) travels through the pathway of the connecting electrolyte.

Perfluorocarbon polymers exemplified by Nafion (registered trademark), Flemion (registered trademark) and Aciplex (registered trademark) are appropriately used for the ion conductive polymer electrolyte containing sulfonic acid group. The ion conductive polymer electrolyte based on the the aromatic hydrocarbon compound such as the sulfonated polyarylene described in this specification may be used in place of the perfluorocarbon polymer.

Preferably, the ion conductive binders are included in a mass ratio of 0.1 to 3.0, preferably 0.3 to 2.0 in particular based on the mass of the catalyst particles. When the ratio of the ion conductive binder is less than 0.1, a proton may not be conducted into the electrolyte, and thus possibly resulting in an insufficient power output. However, when the ratio is more than 3.0, the ion conductive binder may cover the catalyst particles completely, and thus gas cannot reach the platinum, resulting possibly in insufficient power output.

The membrane electrode assembly according to the present invention may be formed solely of an anodic catalyst layer, a cathodic catalyst layer, and a proton conductive membrane; in which, more preferably, a gas diffusion layer formed of conductive porous material such as carbon paper and carbon cloth is disposed outside the catalyst layer along with the anode and cathode. The gas diffusion layer may act as an electric collector, and therefore, the combination of the gas diffusion layer and the catalyst layer is referred to as an "electrode" in this specification, when the gas diffusion layer is provided.

In the solid polymer electrolyte fuel cells equipped with the membrane electrode assembly according to the present invention, oxygen-containing gas is supplied to the cathode and hydrogen-containing gas is supplied to the anode. Specifically, separators having channels for gas passages are disposed outside both electrodes, gas flows into the passage, and thereby the gas for fuel is supplied to the membrane electrode assembly. As described above, the membrane electrode assembly according to the present invention may yield highly effective power generation under lower humidity conditions in particular.

The method for producing the membrane electrode assembly may be selected from various methods: a catalyst layer is formed directly on an ion-exchange membrane and is sandwiched with a gas diffusion layer as required; a catalyst layer is formed on a substrate for a gas diffusion layer such as carbon paper, and then the catalyst layer is connected with an ion-exchange membrane; and a catalyst layer is formed on a flat plate, the catalyst layer is transferred onto an ion-exchange membrane, and then the flat plate is peeled away, and sandwiched with a gas diffusion layer as required.

The method for forming the catalyst layer may be selected from conventional methods such that the supported catalyst and perfluorocarbon polymer having a sulfonic acid group are dispersed into a medium to prepare dispersion. Optionally, a water repellent agent, pore-forming agent, thickener, diluent and the like are added to the dispersion. Then the dispersion is sprayed, coated or filtered on an ion-exchange membrane, gas-diffusion layer or flat plate. In the case in which the catalyst layer is not formed on the ion-exchange layer directly, the catalyst layer and the ion-exchange layer are preferably connected by means of a hot press or adhesion process, etc. (see Japanese Unexamined Patent Application Laid-Open No. 07-220741).

EXAMPLES

The present invention will be explained more specifically with reference to Examples, which are not intended to limit the scope of the present invention. The proton conductive membrane and the membrane electrode assembly were evaluated as follows:

Membrane Preparation

By a casting process, a cast membrane was prepared from 15 mass % solution of the resulting sulfonated polymer, in which the solvent was a mixture in the capacity ratio 50/50 of methanol/NMP. The cast membrane was immersed overnight in a large amount of distilled water, the residual NMP in the membrane was removed by action of dilution, and then the membrane was dried to obtain the desired membrane which was 40 μm thick.

When the proton conductive membrane was prepared from a nitrogen-containing heterocyclic aromatic compound and a sulfonated polymer as described in the Examples, a varnish was prepared by dissolving a predetermined amount of the nitrogen-containing heterocyclic aromatic compound and the resulting sulfonated polyarylene into 50/50 capacity ratio of methanol/NMP so as to correspond to 15 mass % of the solution. In the way as described above, the varnish was formed into the cast membrane, from which the residual NMP in the membrane was removed by means of immersing in a large amount of distilled water, and thereby to obtain the desired membrane which was 40 μm thick.

Sulfonic Acid Equivalent

The resulting sulfonated polymer having a sulfonic acid group was washed with deionized water until becoming neutral so as to sufficiently remove free residual acid, and then was dried. The polymer was then weighed in a predetermined amount and dissolved into a mixture of tetrahydrofuran (THF)/water; then the solutions were titrated with a NaOH standard solution using phenolphthalein as an indicator and the sulfonic acid equivalent was determined from the neutralization point.

Determination of Molecular Weight

The weight average molecular weight of the polymer with no sulfonic acid group was determined as the molecular weight based on a polystyrene standard by means of gel permeation chromatography (GPC) using tetrahydrofuran (THF) for the solvent.

The molecular weight of the polymer having a sulfonic acid group or molecular weight of polymers having sulfonic acid group after the evaluation of thermal resistance was determined as the molecular weight based on a polystyrene standard by means of GPC using a mixture of solvents containing 7.83 g of lithium bromide, 3.3 ml of phosphoric acid and 2 L of N-methyl-2-pyrrolidone (NMP) as an eluting solvent.

Measurement of Proton Conductivity

AC resistance was measured by pushing platinum wires of 0.5 mm diameter onto a surface of a test membrane, which was formed into a strip 5 mm in width, the test membrane was disposed in a controlled temperature/humidity chamber and then AC impedance was measured between the platinum wires. The impedance was measured for AC 10 kHz under conditions of 85 degrees C. and a relative humidity 90%. The measurements were performed by use of Chemical Impedance Measuring System (by NF Corporation), the controlled temperature/humidity chamber was JW241 (by Yamato Scientific Co., Ltd.). Five platinum wires were pushed onto the surface at an interval of 5 mm, the distance between the lines was varied within 5 to 20 mm, and AC resistance was measured. The specific resistance of the membrane was then calculated from the slope of the relationship between line distances and resistances, and proton conductivity was determined as the inverse value of the specific resistance.

Specific Resistance R (ohm·cm) =0.5 (cm)×Membrane Thickness (cm)×Slope (ohm/cm)

Evaluation of Thermal Resistance

The respective films about 40 μm thick were held for 24 hours in an oven at 160 degrees C. The samples before and after the heating were immersed into the above-mentioned NMP-containing GPC eluting solvent at which each of the proton conductive membranes was 0.2 weight parts based on 99.8 weight parts of the GPC eluting solvent, and thereby the samples were exposed to a dissolving environment, and then insoluble matter was removed and GPC measurement was performed. The content of the insoluble matter was determined from the ratio of eluting areas before and after the heating.

Preparation of Membrane Electrode Assembly i) Catalyst Paste

Platinum particles were supported onto a carbon black (furnace black) having an average particle size of 50 nm in a weight ratio 1:1 of carbon black:platinum thereby to prepare catalyst particles. The catalyst particles were dispersed uniformly into a solution of perfluoroalkylene sulfonic acid polymer compound (Nafion (product name), by DuPont) as an ion conductive binder in a mass ratio 8:5 of ion conductive binder:catalyst particles thereby preparing a catalyst paste.

ii) Gas Diffusion Layer

The carbon black and polytetrafluoroethylene (PTFE) particles were mixed in a weight ratio 4:6 of carbon black:PTFE particles, the resulting mixture was dispersed uniformly into ethylene glycol to prepare a slurry, then the slurry was coated and dried on one side of a carbon paper to form an underlying layer, and thereby two gas diffusion layers formed of the underlying layer and the carbon paper were prepared.

iii) Preparation of Electrode-Coating Membrane (CCM)

To both sides of the proton conductive membrane, prepared in the Example, the catalyst paste described above was coated by use of a bar coater in an amount in which the platinum content was 0.5 mg/cm$^2$, and was dried to prepare an electrode-coating membrane (CCM). During the drying step, a first drying at 100 degrees C. for 15 minutes was followed by a secondary drying at 140 degrees C. for 10 minutes.

iv) Preparation of Conjugate of Membranes and Electrodes

A conjugate of membranes and electrodes were prepared in such a way that the CCM was gripped at the side of the underlying layer of the gas diffusion layer, and then was subjected to hot-pressing. In the hot-pressing step, a first hot-pressing at 80 degrees C. and 5 MPa for 2 minutes was followed by a second hot-pressing at 160 degrees C. and 4 MPa for 1 minute.

In addition, the solid polymer electrolyte fuel cell may be constructed from the membrane electrode assembly according to the present invention in such a way that a separator, being also usable as a gas passage, is laminated on the gas diffusion layer.

Evaluation of Power Generating Property

The membrane electrode assembly according to the present invention was evaluated with respect to power generating properties, under the conditions in which the temperature was 70 degrees C., relative humidity was 60%/70% at fuel electrode side/oxygen electrode side, and the current density was 1 A/cm$^2$. Pure hydrogen was supplied to the fuel electrode side, and air was supplied to the oxygen electrode side. The durability was evaluated under the power generating conditions in which the cell temperature was 113 degrees C., the current density was 0.2 A/cm$^2$, and relative humidity was 44% at both fuel and oxygen electrode sides, and then the period up to cross-leak was reported.

Synthesis Example 1

Synthesis of 2,5-dichloro-4'-(1-imidazolyl)benzophenone

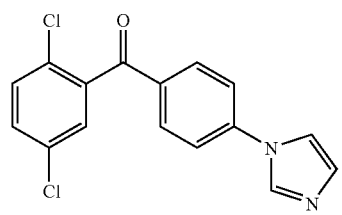

150.7 g (0.560 mol) of 2,5-dichloro-4'-fluorobenzophenon, 114.4 g (1.68 mol) of imidazole, 100.6 g (0.728 mol) of potassium carbonate, and 840 ml of N,N'-dimethylacetamide were added into a 2 L three-necked flask equipped with a stirrer, thermometer, cooling pipe, and nitrogen inlet tube. The reaction solution was heated by use of an oil bath and was allowed to react at 110 degrees C. in a nitrogen atmosphere for 2 hours. After the disappearance of material was confirmed by a thin layer chromatography, the mixture was cooled to ambient temperature. Then, the reaction solution was gradually poured into 3 L of water to cause coagulation. The product obtained by filtration was dissolved into 1.2 L of THF, 4 L of toluene was added, and then washed by brine until the water layer becomes neutral. After the organic layer was dried by magnesium sulfate, the solvent was removed by an evaporator. The rough yield was 180 g.

By using mixture solvent of 1 L of toluene headed at 80 degrees C. and 20 ml of methanol, the dried product was recritallized for isolation to obtain 155 g of white solid in 87% yield. FIG. 1 shows $^1$H-NMR spectra of the resulting compound.

Synthesis Example 2

Synthesis of 2,5-dichloro-4'-(1-pyrrolyl)benzophenone

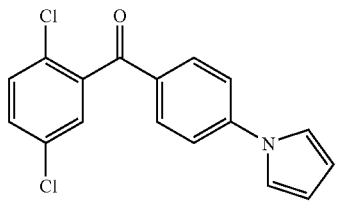

134.6 g (0.500 mol) of 2,5-dichloro-4'-fluorobenzophenon, 50.3 g (0.750 mol) of pyrrole, 76.0 g (0.550 mol) of potassium carbonate, and 840 ml of N,N'-dimethylacetamide were added into a 2 L three-necked flask equipped with a stirrer, thermometer, cooling pipe, and nitrogen inlet tube. The reaction solution was heated by use of an oil bath and was allowed to react at 100 degrees C. in a nitrogen atmosphere for 3 hours. After the disappearance of material was confirmed by a thin layer chromatography, the mixture was cooled to ambient temperature. Then, the reaction solution was gradually poured into 3 L of water to cause coagulation. The product obtained by filtration was dissolved into 2.5 L of toluene was added, and then, by using a separating funnel washed by brine until the water layer becomes neutral. After the organic layer was dried by magnesium sulfate, the solvent was removed by an evaporator. The rough yield was 133.3 g. By using mixture solvent of hexane and ethyl acetate, the dried product was recrystallized for isolation to obtain 125.3 g (0.396 mol) of the intended refining material in 79.3% in yield.

Synthesis Example 3

Synthesis of 2,5-dichloro-4'-(2-benzothiazolethioxy)benzophenone

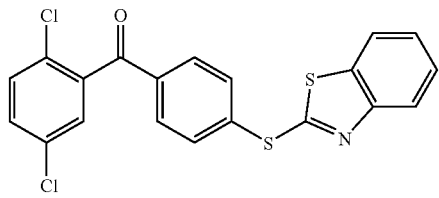

269.1 g (1.000 mol) of 2,5-dichloro-4'-fluorobenzophenon, 175.6 g (1.050 mol) of 2-benzothiazolethiol, 152.0 g (1.100 mol) of potassium carbonate, and 1.500 ml of N,N'-dimethylacetamide were added into a 3 L three-necked flask equipped with a stirrer, thermometer, cooling pipe, and nitrogen inlet tube, and dehydrated. The reaction solution was heated by use of an oil bath and was allowed to react at 110 degrees C. in a nitrogen atmosphere for 2 hours. After the disappearance of material was confirmed by a thin layer chromatography, the mixture was cooled to ambient temperature. Then, the reaction solution was gradually poured into 3 L of water to cause coagulation. The resulting product by filtration was dissolved into 4 L of toluene. The organic layer was washed by brine to be neutral. After the organic layer was dried by magnesium sulfate, the solvent was removed by an evaporator. The rough yield was 350.3 g. By using 1.5 L of toluene heated at 80 degrees C., the dried product was recrystallized for isolation to obtain 325.4 g of the refining material in 78.2% yield.

Example 1

(i) Synthesis of Sulfonated Polymer with Nitrogen-containing Heterocyclic Group Component (A-N1)

185.3 g (540 mmol) of 2,5-dichloro-4'-phenoxybenzophenone, 15.1 g (60 mmol) of 4,4'-dichlorobenzophenone, 11.7 g (78 mmol) of sodium iodide, 11.8 g (18 mmol) of bis(triphenylphosphine)nickel dichloride, 63.0 g (240 mmol) of triphenylphosphine and 94.1 g (1.44 mol) of zinc were added into a three-necked flask, equipped with a cooling pipe and a three-way stopcock, the flask was dipped into an oil bath at 70 degrees C., purged with nitrogen gas, and then 1000 ml of N-methyl-2-pyrrolidone was added in a nitrogen atmosphere and the reaction was initiated. After being allowed to react for 20 hours, the reaction mixture was diluted with 500 ml of N-methyl-2-pyrrolidone, the polymerization reaction liquid was poured into a solution of 1/10 of HCl/methanol to make the polymer precipitate, the precipitation was washed, filtered and vacuum-dried, resulting in a white powder. The yield was 148 g. In addition, the weight average molecular weight was 154,000. The polymer of 150 g was sulfonated by so that 1500 ml of concentrated sulfuric acid was added to the polymer and stirred at ambient temperature for 24 hours. Following the reaction period, the reaction mixture was poured into a large amount of deionized water, and thereby sulfonated polymer was precipitated. The polymer was washed with deionized water until becoming the pH of 7, and then the polymer was filtered, collected, and vacuum-dried at 90 degrees C. The yield of the sulfonated polymer was 159 g. The polymer had an ion-exchange capacity of 2.3 meq/g and a weight average molecular weight of 183,000. The resulting polymer is expressed by the formula (A-N1), and denoted as "polymer A-N1".

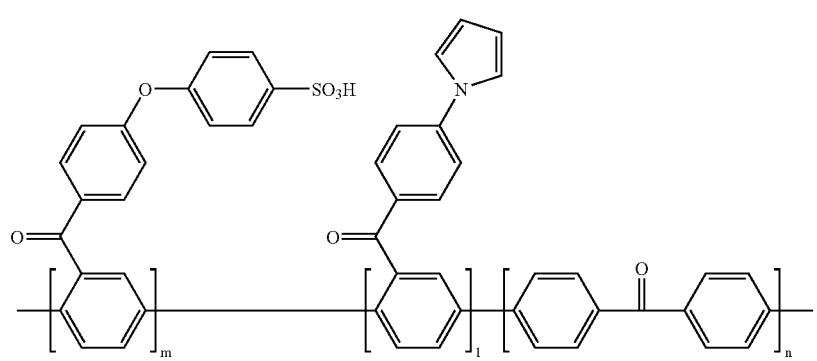

(A-N1)

(ii) Evaluation of Physical Properties and Power Generating Characteristics of Polymer A-N1

The obtained polymer A-N1 was dissolved in a mixture of solvents methanol/NMP=50/50 at a concentration of 15 mass % to prepare a varnish. In the way as described above, the varnishes were formed into a cast membrane, from which the residual NMP in the membrane was removed by means of immersing in a large amount of distilled water to obtain the desired membrane which was 40 μm thick. The proton conductivity and the heat resistance of the resulting membrane were evaluated. In addition, a membrane electrode assembly was produced, and then the power generation performance and the durability of the membrane were evaluated. The results are summarized in Table 1.

Example 2

(i) Synthesis of Hydrophobic Unit B 29.8 g (104 mol) of 4,4'-dichlorodiphenyl sulfone, 37.4 g (111 mmol) of 2,2-bis(4-hydroxyphenyl)-1,1,1,3,3,3-hexafluoropropane, 20.0 g (145 mmol) of potassium carbonate were added into a 1 L three-necked flask equipped with a stirrer, thermometer, Dean-stark apparatus, nitrogen inlet tube, and cooling pipe. After purging with nitrogen gas, 168 ml of sulfolane and 84 ml of toluene were added and stirred, and then the reaction liquid was heated to 150 degrees C. and refluxed by use of an oil bath. Water generated through the reaction was trapped in the Dean-Stark apparatus. When water generation became nearly zero after three hours, toluene was removed from the Dean-Stark apparatus. The temperature of the reaction mixture was gradually raised to 200 degrees C., stirring was continued for 5 hours, and then 7.5 g (30 mmol) of 4,4'-dichlorodiphenylsulfone was added, and this was allowed to further react for 8 hours. The reaction liquid was allowed to cool and then diluted by adding 100 ml of toluene. Inorganic salts which were insoluble in the reaction liquid were filtered, and then the filtrate was poured into 2 L of methanol to cause precipitation. The precipitated product was filtered, dried, and then dissolved into 250 ml of tetrahydrofuran, and then the solution was poured into 2 L of methanol to cause re-precipitation. The precipitated white powder was filtered and dried, thereby 56 g of the hydrophobic unit B was obtained, of which the number average molecular weight (Mn) was 10,500 measured by GPC. The resulting compound is expressed by the formula (B-1).

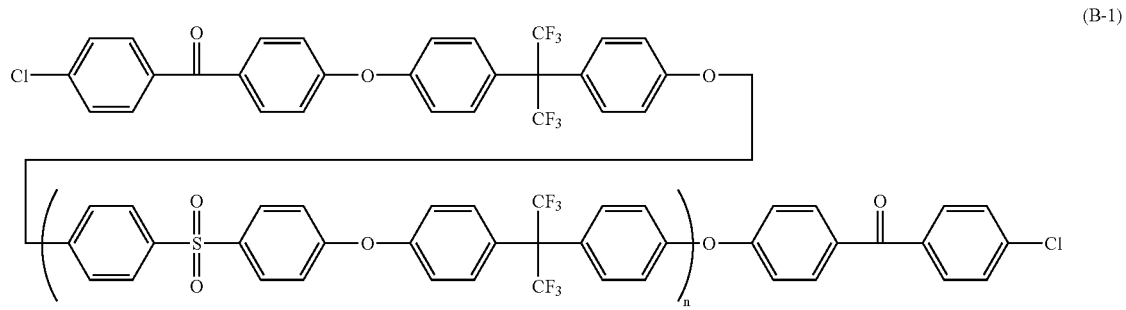

(B-1)

(ii) Synthesis of Sulfonated Polymer with Nitrogen-Containing Heterocyclic Group Component (B-1)

141.6 g (338 mmol) of 3-(2,5-dichlorobenzoyl)benzenesulfonic acid neopentyl, 44.5 g (4.2 mmol) of the obtained hydrophobic unit B (Mn=10,500), 5.4 g (16.9 mmol) of 2,5-dichloro-4'-(1-imidazole)benzophenone, 6.71 g (10.3 mmol) of bis(triphenylphosphine) nickel dichloride, 1.54 g (10.3 mmol) of sodium iodide, 35.9 g (137 mmol) of triphenylphosphine and 53.7 g (820 mmol) of zinc were added into a 1 L three-necked flask, equipped with a stirrer, a thermometer, and a nitrogen inlet tube, and then purging with dry nitrogen gas. To the mixture, 430 ml of N,N-dimethylacetamide (DMAc) was added, the reaction mixture was maintained at 80 degrees C. and was stirred successively for 3 hours, and then the reaction mixture was diluted with 730 ml of DMAc, and insoluble matter was filtered out. The resulting solution was poured into a 2 L three-necked flask, equipped with a stirrer, a thermometer, and a nitrogen inlet tube, and then the content was stirred while heating at 115 degrees C. and 44 g (506 mmol) of lithium bromide was added. After stirring for 7 hours, the reaction mixture was poured into 5 L of acetone to precipitate the product. The resulting product was rinsed with 1N HCl and deionized water in that order, and then dried to obtain 124 g of the intended sulfonated polymer. The weight average molecular weight (Mw) of the resulting polymer was 166,000. The ion-exchange capacity of the polymer was 2.3 meq/g. The resulting polymer is expressed by the formula formula (B-N1), and denoted as "polymer B-N1".

ture of the reaction mixture was then raised gradually from 130 degrees C. to 150 degrees C., and thus almost all of the toluene was removed. The mixture was allowed to further react at 150 degrees C. for 10 hours, and then 10.0 g (0.040 mole) of 4,4'-DCBP was added and was allowed to further

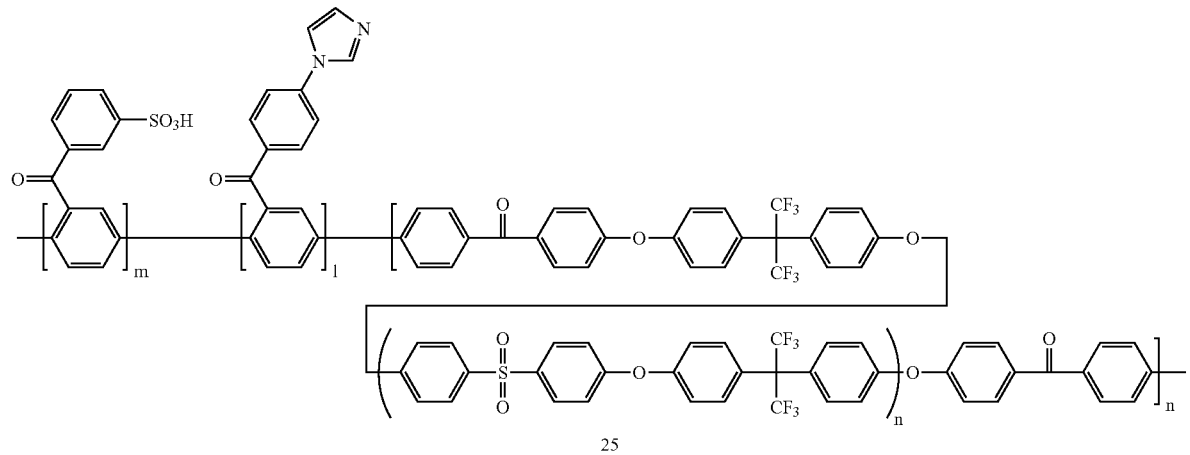

(B-N1)

(iii) Evaluation of Physical Properties and Power Generating Characteristics of Polymer B-N1

The obtained polymer B-N1 was dissolved into a mixture of solvents methanol/NMP=50/50 at a concentration of 15 mass % to prepare a varnish. In the way as described above, the varnishes were formed into a cast membrane, from which the residual NMP in the membrane was removed by means of immersing in a large amount of distilled water, and thereby to obtain the desired membrane which was 40 μm thick. The proton conductivity and the heat resistance of the resulting membrane were evaluated. In addition, a membrane electrode assembly was produced, and then the power generation performance and the durability of the membrane were evaluated. The results are summarized in Table 1.

react for 5 hours. The resulting reaction liquid was allowed to cool, and then byproduct deposition of inorganic compounds was filtered out and the filtrate was poured into 4 L of methanol. The deposited product was filtered, collected, and dried, and then was dissolved into 300 ml of tetrahydrofuran, which was poured into 4 L of methanol to precipitate again, and thereby 95 g of the intended product was obtained in 85% yield.

The number average molecular weight of the resulting polymer was 11,200 based on a polystyrene standard by means of GPC using THF as the solvent. The resulting compound was the oligomer expressed by the formula (C-1) below.

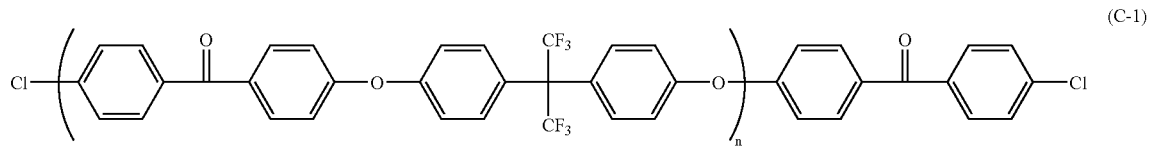

(C-1)

Example 3

(i) Synthesis of Hydrophobic Unit C 67.3 g (0.20 mol) of 2,2-bis(4-hyroxyphenyl)-1,1,1,3,3,3-hexafluoropropane, 60.3 g (0.24 mol) of 4,4'-dichlorobenzophenone (4,4'-DCBP), 71.9 g (0.52 mol) of potassium carbonate, 300 ml of N,N-dimethylacetamide (DMAc), and 150 ml of toluene were added into a 1 L three-necked flask equipped with a stirrer, a thermometer, a cooling pipe, a Dean-Stark apparatus, and a three-way stopcock for introducing nitrogen. The mixture was heated by use of an oil bath and was allowed to react at 130 degrees C. in a nitrogen atmosphere while being stirred. The reaction was carried out while the water generated through the reaction was co-distilled with toluene and removed through the Dean-Stark apparatus; after three hours, water generation fell to nearly zero. The tempera- (ii) Synthesis of Sulfonated Polymer with Nitrogen-Containing Heterocyclic Group Component (C-N1)

Dried 100 ml of N,N-dimethylacetamide (DMAc) was added into the mixture of 27.21 g (38.6 mmol) of the monomer expressed by the formula (C-2), 16.13 g (1.44 mmol) of the resulting hydrophobic unit syntesized in step (i) described in this Example, 0.80 g (1.93 mmol) of 2,5-dichloro-4'-(2-benzothiazolethioxy)benzophenone, 0.79 g (1.2 mmol) of bis(triphenylphosphine) nickel dichloride, 4.20 g (16.0 mmol) of triphenylphosphine, 0.18 g (1.20 mmol) of sodium iodide, and 6.28 g (96.1 mmol) of zinc under a nitrogen atmosphere.

The reaction mixture was heated while stirring to 79 degrees C. for the last time and allowed to react for 3 hours. The viscosity increase of the reaction mixture was observed during the reaction period. The solution of polymerization reaction was diluted with 425 ml of DMAC, the mixture was stirred for 30 minutes, and then was filtered by use of celite as a filter aid.

A portion of the filtrate was poured into methanol and was thereby coagulated. The resulting copolymer, formed of a sulfonic acid derivative protected by a neopentyl group, had a molecular weight of Mn=57,500 and Mw=175,300.

The filtrate was concentrated into 344 g by use of an evaporator, to which was added 10.1 g (0.116 mol) of lithium bromide, and then the mixture was allowed to react at 110 degrees C. for 7 hours in a nitrogen atmosphere. After the reaction period, the reaction mixture was cooled to ambient temperature, and then was poured into 4 L of acetone to cause coagulation. The coagulated material was filtered, air-dried, and milled by a mixer, and then was washed with 1500 ml of 1N HCl while stirring. After filtration, the product was washed with deionized water until the pH was no less than 5, dried at 80 degrees C. overnight, and thereby the intended sulfonated polymer of 23.0 g was obtained. The sulfonated polymer had a molecular weight of Mn=63,000 and Mw=194,000. The ion-exchange capacity of the polymer was 2.0 meq/g. The resulting polymer with a sulfonic acid group is expressed by the formula (C-N1), and denoted as "polymer C-N1".

was produced, and then the power generation performance and the durability of the membrane were evaluated. The results are summarized in Table 1.

Example 4

(i) Synthesis of Hydrophobic Unit D 49.4 g (0.29 mol) of 2,6-dichlorobenzonitrile, 88.4 g (0.26 mol) of 2,2-bis(4-hyroxyphenyl)-1,1,1,3,3,3-hexafluoropropane, and 47.3 g (0.34 mol) of potassium carbonate were added into a 1 L three-necked flask equipped with a stirrer, a thermometer, a cooling pipe, a Dean-Stark apparatus, and a three-way stopcock for introducing nitrogen. After purging with nitrogen gas, 346 ml of sulfolane and 173 ml of toluene were added and stirred. The flask was dipped into an oil bath, heated to 150 degrees C., and refluxed. The reaction was carried out while the water generated through the reaction was co-distilled with toluene and removed through the Dean-Stark apparatus. After three hours, water generation fell to nearly zero. Thus, almost all of the toluene was removed, and continued to be reacted at 200 degrees C. for 3 hours. Then, 12.3 g (0.072 mol) of 2,6-dichlorobenzonitrile were added and reacted for 5 hours more.

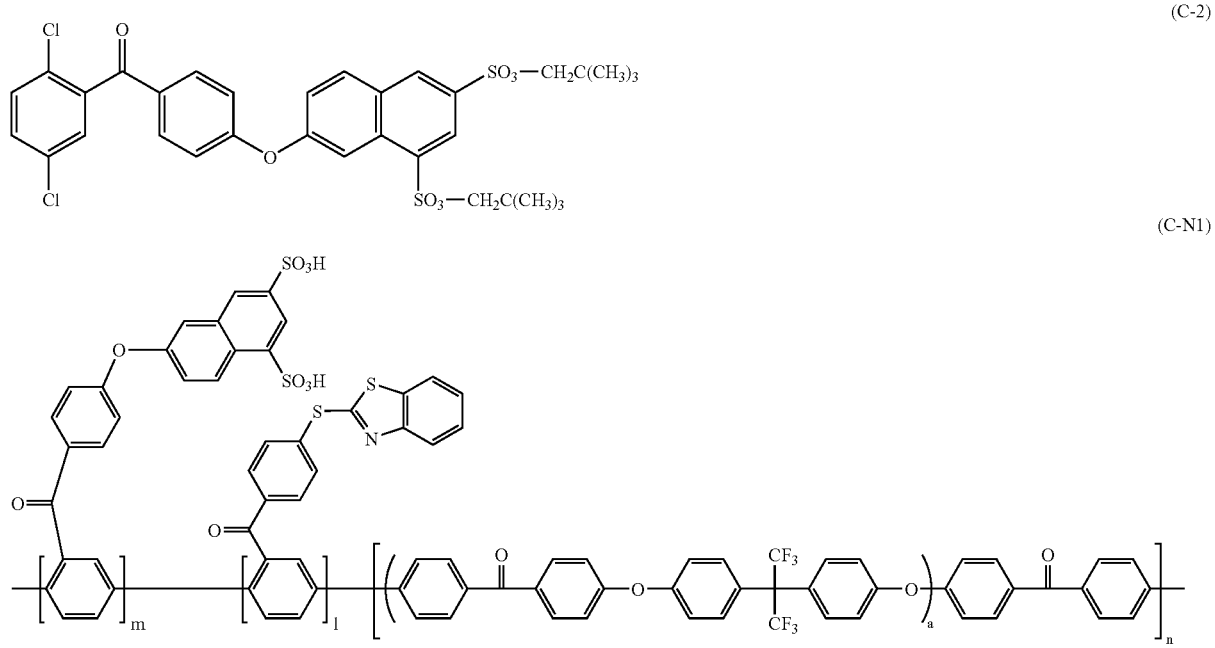

(iii) Evaluation of Physical Properties and Power Generating Characteristics of Polymer C-N1

The obtained polymer C-N1 was dissolved into a mixture of solvents methanol/NMP=50/50 at a concentration of 15 mass % to prepare a varnish. In the way as described above, the varnishes were formed into a cast membrane, from which the residual NMP in the membrane was removed by means of immersing in a large amount of distilled water to obtain the desired membrane which was 40 μm thick. The proton conductivity and the heat resistance of the resulting membrane were evaluated. In addition, a membrane electrode assembly The resulting reaction liquid was allowed to cool and was then diluted by adding 100 ml of toluene. The byproduct deposition of inorganic compounds was filtered out and the filtrate was poured into 2 L of methanol. The deposited product was filtered, collected, and dried, and then was dissolved into 250 ml of tetrahydrofuran, which was poured into 2 L of methanol to precipitate again, and thereby 107 g of the intended product was obtained.

The number average molecular weight of the resulting compound was 7,300 based on a polystyrene standard by means of GPC using THF as the solvent. The resulting compound was oligomer expressed by the formula (D-1).

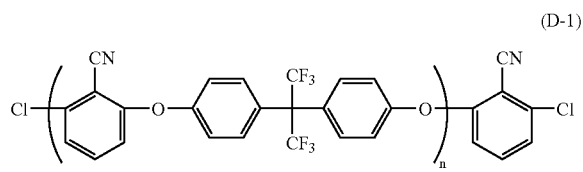

(D-1)

(ii) Synthesis of Sulfonated Polymer with Nitrogen-Containing Heterocyclic Group Component (D-N1)

540 ml of dried N,N-dimethylacetamide (DMAC) was added into the mixture of 135.0 g (336 mmol) of 3-(2,5-dichlorobenzoyl)benzenesulfonic acid neopentyl, 40.7 g (5.6 mmol) of the resulting hydrophobic unit D synthesized in step (i) in this Example, 6.71 g (16.8 mmol) of 2,5-dichloro-4'(1-imidazolyl)benzophenone, 6.71 g (10.3 mmol) of bis(triphenylphosphine) nickel dichloride, 35.9 g (137.0 mmol) of triphenylphosphine, sodium iodide 1.54 g (10.3 mmol), and 53.7 g (821 mmol) of zinc in a nitrogen atmosphere.

The reaction mixture was heated while stirring to 79 degrees C. for the last time and allowed to react for 3 hours. The viscosity increase of the reaction mixture was observed during the reaction period. The solution of polymerization reaction was diluted with 730 ml of DMAc, the mixture was stirred for 30 minutes, and then was filtered by use of celite as a filter aid.

A portion of the filtrate was poured into methanol and was thereby coagulated. The resulting copolymer, formed of a sulfonic acid derivative protected by a neopentyl group, had a molecular weight of Mn=58,000 and Mw=135,300.

The filtrate was concentrated by use of an evaporator, to which was added 43.8 g (505 mol) of lithium bromide, and then the mixture was allowed to react at 110 degrees C. for 7 hours in a nitrogen atmosphere. After the reaction period, the reaction mixture was cooled to ambient temperature, and then was poured into 4 L of acetone to cause coagulation. The coagulated material was filtered, air-dried, and milled by a mixer, and then was washed with 1500 ml of 1N HCl while stirring. After filtration, the product was washed with deionized water until the pH was no less than 5, dried at 80 degrees C. overnight, and thereby 23.0 g of the intended sulfonated polymer was obtained. The sulfonated polymer had a molecular weight of Mn=60,000 and Mw=175,000. The ion-exchange capacity of the polymer was 2.4 meq/g. The resulting polymer with a sulfonic acid group is expressed by the formula (D-N1), and denoted as "polymer D-N1".

(iii) Evaluation of Physical Properties and Power Generating Characteristics of Polymer D-N1

The obtained polymer D-N1 was dissolved in a mixture of solvents methanol/NMP=50/50 at a concentration of 15 mass % to prepare a varnish. By a casting process, the varnishes were formed into a cast membrane, from which the residual NMP in a membrane was removed by means of immersing in a large amount of distilled water to obtain the desired membrane which was 40 pm thick. The proton conductivity and the heat resistance of the resulting membrane were evaluated. In addition, a membrane electrode assembly was produced, and then the power generation performance and the durability of the membrane were evaluated. The results are summarized in Table 1.

Comparative Example 1

(i) Synthesis of Sulfonated Polymer RA 185.3 g (540 mmol) of 2,5-dichloro-4'-phenoxybenzophenone, 15.1 g (60 mmol) of 4,4'-dichlorobenzophenone, 11.7 g (78 mmol) of sodium iodide, 11.8 g (18 mmol) of bis(triphenylphosphine) nickel dichloride, 63.0 g (240 mmol) of triphenylphosphine and 94.1 g (1.44 mol) of zinc were added into a three-necked flask, equipped with a cooling pipe and a three-way stopcock, the flask was dipped into an oil bath at 70 degrees C. and purged with nitrogen gas, and then 1000 ml of N-methyl-2-pyrrolidone was added in a nitrogen atmosphere and the reaction was initiated. After being allowed to react for 20 hours, the reaction mixture was diluted with 500 ml of N-methyl-2-pyrrolidone, the polymerization reaction liquid was poured into a solution of 1/10 of HCl/methanol to make the polymer precipitate, the precipitation was washed, filtered and vacuum-dried, resulting in a white powder. The yield was 153 g. The weight average molecular weight was 159,000. The polymer of 150 g was sulfonated by so that 1500 ml of concentrated sulfuric acid was added to the polymer and stirred at ambient temperature for 24 hours. Following the reaction period, the reaction mixture was poured into a large amount of deionized water, and thereby sulfonated polymer was precipitated. The polymer was washed with deionized water until becoming the pH of 7, and then the polymer was filtered, collected, and vacuum-dried at 90 degrees C. The yield of the sulfonated polymer was 179 g. The polymer had an ion-exchange capacity of 2.3 meq/g and a weight average molecular weight of 183,000. The resulting polymer is expressed by the formula (RA), and denoted as "polymer RA".

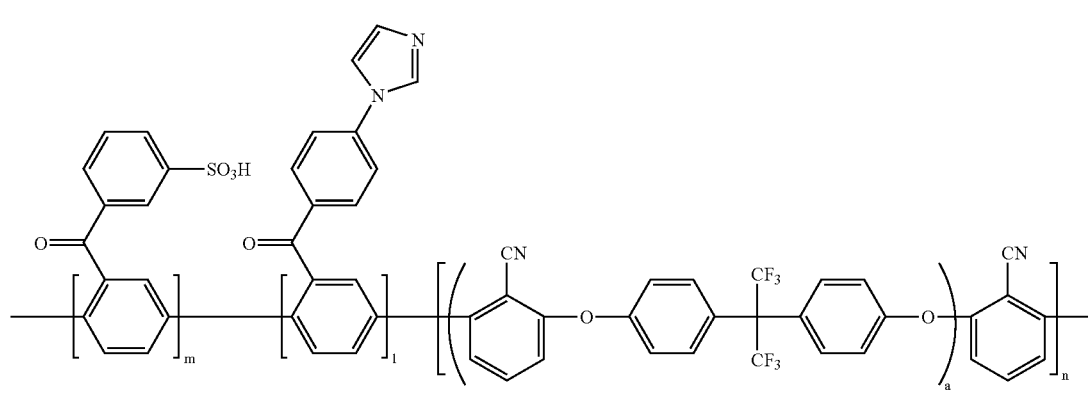

(D-N1)

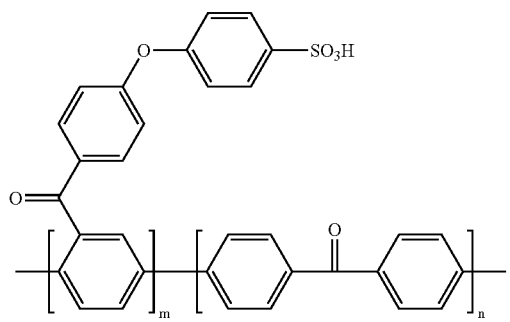

(ii) Evaluation of Physical Properties and Power Generating Characteristics of Sulfonated Polymer RA The obtained sulfonated polymer RA was dissolved into a mixture solvent of methanol/NMP=50/50 at a concentration of 15 mass % to prepare a varnish. By a casting process, the varnish was formed into a cast membrane, from which the residual NMP in membranes was removed by means of immersing in a large amount of distilled water to obtain the desired membrane which was 40 μm thick. The proton conductivity and the heat resistance of the resulting membrane were evaluated. In addition, a membrane electrode assembly was produced, and then the power generation performance and the durability of the membrane were evaluated. The results are summarized in Table 1.

Comparative Example 2

(i) Synthesis of Sulfonated Polymer RB 141.5 g (337 mmol) of 3(2,5-dichlorobenzoyl)benzenesulfonic acid neopentyl, 48.5 g (4.6 mmol) of the hydrophobic unit B obtained in (i) described in Example 2, 6.71 g (10.3 mmol) of bis(triphenylphosphine) nickel dichloride, 1.54 g (10.3 mmol) of sodium iodide, 35.9 g (137 mmol) of triphenylphosphine and 53.7 g (821 mmol) of zinc were added into a 1 L three-necked flask, equipped with a stirrer, a thermometer, and a nitrogen inlet tube, and then purging with dry nitrogen gas. To the mixture, 430 ml of N,N-dimethylacetamide (DMAc) was added, the reaction mixture was maintained at 80 degrees C. and was stirred successively for 3 hours, and then the reaction mixture was diluted with 730 ml of DMAc, and insoluble matter was filtered out.

The resulting solution was poured into a 2 L three-necked flask, equipped with a stirrer, a thermometer, and a nitrogen inlet tube, and then the content was stirred while heating at 115 degrees C. and 44 g (506 mmol) of lithium bromide was added. After stirring for 7 hours, the reaction mixture was poured into 5 L of acetone to precipitate the product. The resulting product was rinsed with 1N HCl and deionized water in that order, and then dried to obtain the intended sulfonated polymer of 124 g. The weight average molecular weight of the resulting polymer was 170,000. The ion-exchange capacity of the polymer was 2.3 meq/g. The resulting polymer is expressed by the formula (RB), and denoted as "polymer RB".

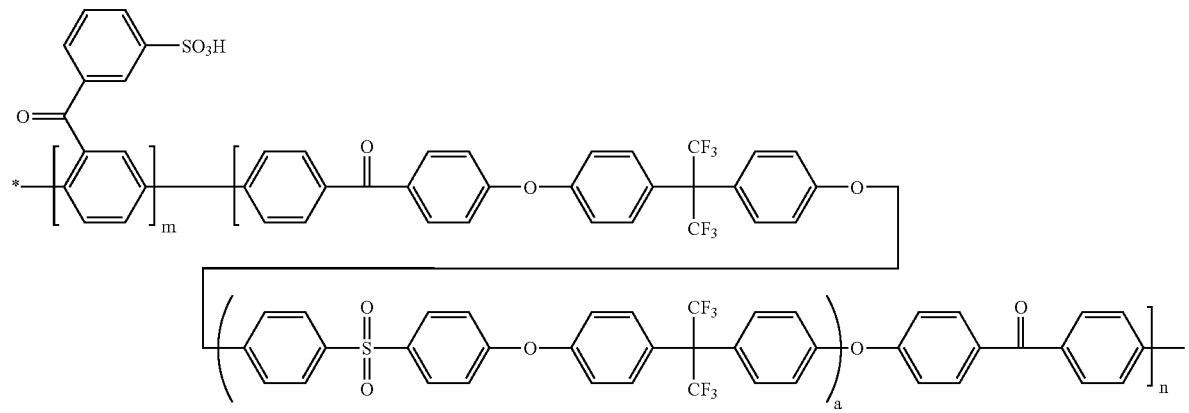

(ii) Evaluation of Physical Properties and Power Generating Characteristics of Sulfonated Polymer RB The obtained sulfonated polymer RB was dissolved into a mixture of solvents of methanol/NMP=50/50 at a concentration of 15 mass % to prepare a varnish. By a casting process, the varnish was formed into a cast membrane, from which the residual NMP in the membrane was removed by means of immersing in a large amount of distilled water to obtain the desired membrane which was 40 μm thick. The proton conductivity and the heat resistance of the resulting membrane were evaluated. In addition, a membrane electrode assembly was produced, and then the power generation performance and the durability of the membrane were evaluated. The results are summarized in Table 1.

Comparative Example 3

(i) Synthesis of Sulfonated Polymer RC 100 ml of Dried N,N-dimethylacetamide (DMAc) was added into the mixture of 27.18 g (38.5 mmol) of the compound monomer expressed by the formula (C-2), 16.58 g (1.48 mmol) of the resulting hydrophobic unit synthesized in step (i) described in Example 3, 0.79 g (1.2 mmol) of bis (triphenylphosphine) nickel dichloride, 4.20 g (16.0 mmol) of triphenylphosphine, 0.18 g (1.20 mmol) of sodium iodide, and 6.28 g (96.1 mmol) of zinc in a nitrogen atmosphere.

The reaction mixture was heated while stirring to 79 degrees C. for the last time and allowed to react for 3 hours. The viscosity increase of the reaction mixture was observed during the reaction period. The solution of polymerization reaction was diluted with 425 ml of DMAc, the mixture was stirred for 30 minutes, and then was filtered by use of celite as a filter aid.

A portion of the filtrate was poured into methanol and was thereby coagulated. The resulting copolymer, formed of a sulfonic acid derivative protected by a neopentyl group, had a molecular weight of Mn=59,400 and Mw=178,300.

The filtrate was concentrated into 344 g, to which was added 10.0 g (0.116 mol) of lithium bromide, and then the mixture was allowed to react at 110 degrees C. for 7 hours in a nitrogen atmosphere. After the reaction period, the reaction mixture was cooled to ambient temperature, and then was poured into 4 L of acetone to cause coagulation. The coagulated material was filtered, air-dried, and milled by a mixer, and then was washed with 1500 ml of 1N HCl while stirring. After filtration, the product was washed with deionized water until the pH was no less than 5, dried at 80 degrees C. overnight, and thereby the intended sulfonated polymer of 23.0 g was obtained. The sulfonated polymer had a molecular weight of Mn=65,500 and Mw=197,000. The ion-exchange capacity of the polymer was 2.0 meq/g. The resulting polymer RC having a sulfonic acid group is the compound expressed by the formula (RC).

Comparative Example 4

(i) Synthesis of Sulfonated Polymer RD 134.6 g (336 mmol) of 3-(2,5-dichlorobenzoyl)benzenesulfonic acid neopentyl, 47.4 g (6.5 mmol) of the hydrophobic unit D obtained in (i) described in Example 4, 6.71 g (10.3 mmol) of bis(triphenylphosphine) nickel dichloride, 1.54 g (10.3 mmol) of sodium iodide, and 53.7 g (821 mmol) of zinc were added into a 1 L three-necked flask, equipped with a stirrer, a thermometer, and a nitrogen inlet tube. 430 ml of dried N,N-dimethylacetamide(DMAc) were added into the mixture in a nitrogen atmosphere.

The reaction mixture was heated while stirring to 79 degrees C. for the last time and allowed to react for 3 hours. The viscosity increase of the reaction mixture was observed during the reaction period. The solution of polymerization reaction was diluted with 730 ml of DMAc, the mixture was stirred for 30 minutes, and then was filtered by use of celite as a filter aid.

A portion of the filtrate was poured into methanol and was thereby coagulated. The resulting copolymer, formed of a sulfonic acid derivative protected by a neopentyl group, had a molecular weight of Mn=59,400 and Mw=38,00000.

The filtrate was concentrated, to which 44.0 g (506 mmol) of lithium bromide was added, and then the mixture was

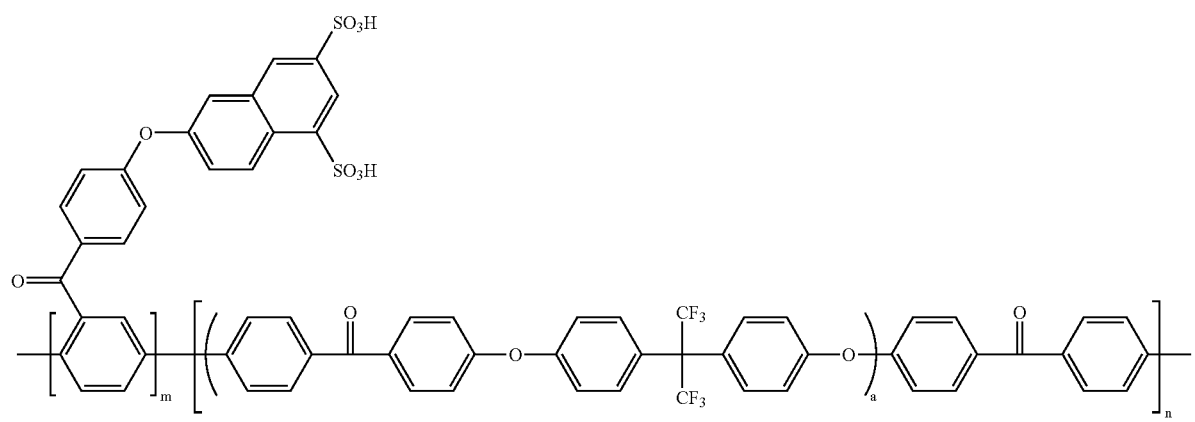

(RC)

(ii) Evaluation of Physical Properties and Power Generating Characteristics of Sulfonated Polymer RC The sulfonated polymer C obtained in Synthesis Example 3 was dissolved in a mixture of solvents methanol/NMP=50/50 at a concentration of 15 mass % to prepare a varnish. By a casting process, the varnish was formed into a cast membrane, from which the residual NMP in a membrane was removed by means of immersing in a large amount of distilled water to obtain the desired membrane which was 40 μm thick. The proton conductivity and the heat resistance of the resulting membrane were evaluated. In addition, a membrane electrode assembly was produced, and then the power generation performance and the durability of the membrane were evaluated. The results are summarized in Table 1.

allowed to react at 110 degrees C. for 7 hours in a nitrogen atmosphere. After the reaction period, the reaction mixture was cooled to ambient temperature, and then was poured into 5 L of acetone to cause coagulation. The coagulated material was filtered, air-dried, and milled by a mixer, and then was washed with 1500 ml of 1N HCl while stirring. After filtration, the product was washed with deionized water until the pH was no less than 5, dried at 80 degrees C. overnight, and thereby 122 g of the intended sulfonated polymer was obtained. The molecular weight of the sulfonated polymer after this de-protection was Mn=68,000, Mw=140,000. The ion-exchange capacity of the polymer was 2.4 meq/g. Polymer RD having provided sulfonated group was chemical agent expressed in the formula (RD).

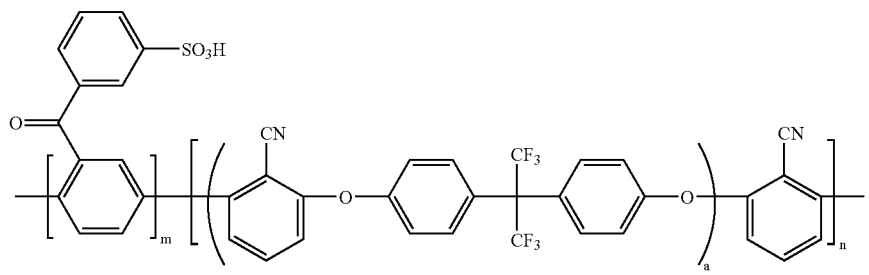

(RD)

(ii) Evaluation of Physical Properties and Power Generating Characteristics of Sulfonated Polymer RD The obtained sulfonated polymer C was dissolved in a mixture of solvents methanol/NMP=50/50 at a concentration of 15 mass % to prepare a varnish. By a casting process, the varnish was formed into a cast membrane, from which the residual NMP in membranes was removed by means of immersing in a large amount of distilled water to obtain the desired membrane which was 40 μm thick. The proton conductivity and the heat resistance of the resulting membrane were evaluated. In addition, a membrane electrode assembly was produced, and then the power generation performance and the durability of the membrane were evaluated. The results are summarized in Table 1.

sulfonic acid group, and a second branched chain having a nitrogen-containing heterocyclic group.

2. The membrane electrode assembly for solid polymer electrolyte fuel cells according to claim 1, wherein the branched chain having a nitrogen-containing heterocyclic group is expressed by the general formula (D) below:

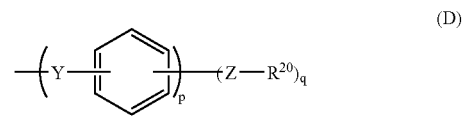

(D)

TABLE 1

| | Sulfonated Polymer | Nitrogen-comtaining Compound | Specific Resistance (ohm · cm) | Heat Test Unsoluble Matter (mass %) | Power Generating Performance (V) | Power Generating Durability (hr) |
|---|---|---|---|---|---|---|
| Example 1 | Polymer A-N1 | Pyrrole | 3.6 | 0 | 0.651 | 350 |
| Comparative Example 1 | Polymer RA | — | 3.6 | 80 | 0.651 | 250 |
| Example 2 | Polymer B-N1 | Imidazole | 3.0 | 0 | 0.655 | 510 |
| Comparative Example 2 | Polymer RB | — | 3.1 | 35 | 0.654 | 360 |
| Example 3 | Polymer C-N1 | Benzothiazole | 3.0 | 0 | 0.650 | 460 |
| Comparative Example 3 | Polymer RC | — | 3.0 | 15 | 0.649 | 300 |
| Example 4 | Polymer D-N1 | Imidazole | 2.7 | 0 | 0.657 | 1030 |
| Comparative Example 4 | Polymer RD | — | 2.6 | 20 | 0.658 | 950 |

According to the Examples, by including a nitrogen-containing heterocyclic aromatic group, a membrane electrode assembly having superior proton conductivity and heat resistance is provided. In particular, a membrane electrode assembly also exhibiting superior power performance is provided by using the proton conductive membrane of this invention.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A membrane electrode assembly for solid polymer electrolyte fuel cells, comprising: an anode electrode; a cathode electrode; and a solid polymer electrolyte membrane, the anode electrode and the cathode electrode disposed on opposite sides of the solid polymer electrolyte membrane, wherein the solid polymer electrolyte membrane contains a copolymer comprising a principal chain that forms a polyphenylene structure, a first branched chain having a in which, Z represents at least one structure selected from the group consisting of a direct bond, —O— and —S—; Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—; R$^{20}$ represents a nitrogen-containing heterocyclic group; q represents an integer of 1 to 5; p represents an integer of 0 to 4.

3. The membrane electrode assembly for solid polymer electrolyte fuel cells according to claim 1, wherein the nitrogen-containing heterocyclic group is at least one group induced by compounds selected from the group consisting of pyrrole, thiazole, isothiazole, oxazole, isoxazole, pyridine, imidazole, imidazoline, pyrazole, 1,3,5-triazine, pyrimidine, pyridazine, pyrazine, indole, quinoline, isoquinoline, purine, benzimidazole, benzoxazole, benzthiazole, tetrazole, tetrazine, triazole, carbazole, acridine, quinoxaline, quinazoline, and derivatives thereof.

4. The membrane electrode assembly for solid polymer electrolyte fuel cells according to claim 1, comprising the branched chain having a sulfonic acid group expressed by the general formula (E) below:

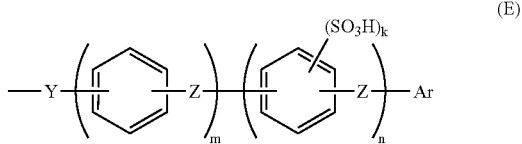

in which, Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—; Z represents a direct bond, or at least a structure selected from the group consisting of —(CH$_2$)$_l$— (l is an integer of 1 to 10), —C(CH$_3$)$_2$—, —O— and —S—; Ar represents an aromatic group having a substituent expressed by —SO$_3$H, —O(CH$_2$)$_h$SO$_3$H or —O(CF$_2$)$_h$SO$_3$H; in which h is an integer of 1 to 12, m is an integer of 0 to 10, n is an integer of 0 to 10, and k is an integer of 1 to 4.

5. The membrane electrode assembly for solid polymer electrolyte fuel cells according to claim 1, wherein the copolymer further comprises constitutional units expressed by the formula (C) and (A) below:

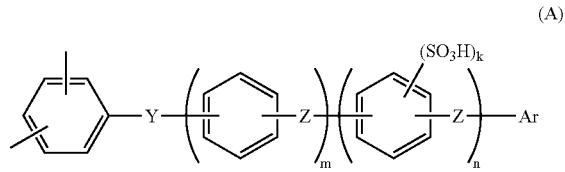

in the formula (C), Z represents at least one structure selected from the group consisting of a direct bond, —O— or —S—; Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—; R$^{20}$ represents a nitrogen-containing heterocyclic group; q represents an integer of 1 to 5; p represents an integer of 0 to 4;

(A)

in the formula (A), Y represents at least one structure selected from the group consisting of —CO—, —SO$_2$—, —SO—, —CONH—, —COO—, —(CF$_2$)$_l$— (l is an integer of 1 to 10) and —C(CF$_3$)$_2$—; Z represents a direct bond, or at least one structure selected from the group consisting of —(CH$_2$)$_l$— (l is an integer of 1 to 10), —C(CH$_3$)$_2$—, —O— and —S—; Ar represents an aromatic group having a substituent expressed by —SO$_3$H, —O(CH$_2$)$_h$SO$_3$H or —O(CF$_2$)$_h$SO$_3$H; in which h is an integer of 1 to 12, m is an integer of 0 to 10, n is an integer of 0 to 10, and k is an integer of 1 to 4.

6. The membrane electrode assembly for solid polymer electrolyte fuel cells according to claim 5, comprising 0.5 to 99.5 mol % of the structure expressed by the general formula (A), and 0.1 to 99.9 mol % of the structure expressed by the general formula (C).

7. The membrane electrode assembly for solid polymer electrolyte fuel cells according to claim 5, wherein the ratio of constitutional units expressed by the general formula (C) to (A) is 0.001 to 50 mol %.

8. The membrane electrode assembly for solid polymer electrolyte fuel cells of claim 1 wherein the copolymer further comprises includes a constitutional unit expressed by the general formula (B) below:

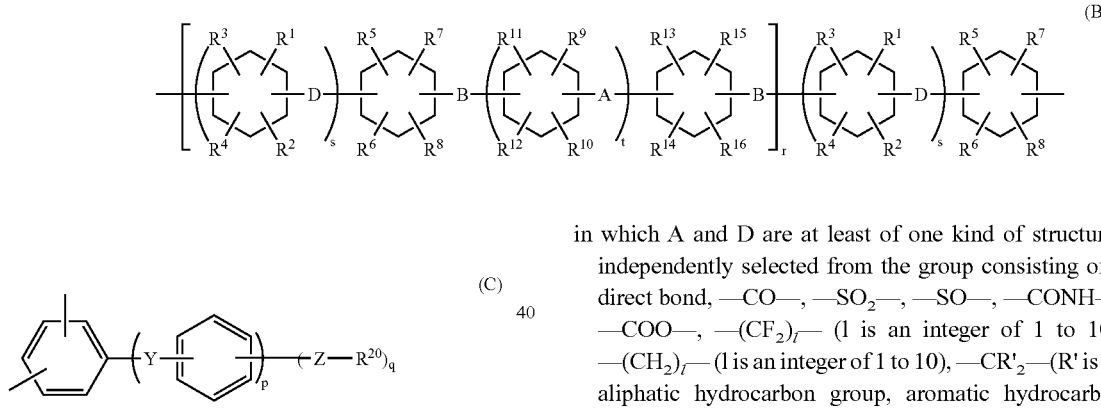

in which A and D are at least of one kind of structures independently selected from the group consisting of a direct bond, —CO—, —SO$_2$—, —SO—, —CONH—, —COO—, —(CF$_2$)$_l$— (l is an integer of 1 to 10), —(CH$_2$)$_l$— (l is an integer of 1 to 10), —CR'$_2$— (R' is an aliphatic hydrocarbon group, aromatic hydrocarbon group, or halogenated hydrocarbon group), cyclohexylidene group, fluorenylidene group, —O—, —S—; B is independently an oxygen or sulfur atom; R$^1$ to R$^{16}$, which may be identical or different from each other, represent at least one atom or group selected from a hydrogen atom, fluorine atom, alkyl group, partly or fully halogenated alkyl group, allyl group, aryl group, nitro group and nitrile group; s and t are integers of 0 to 4; r is an integer of 0 or more than 1.

9. The membrane electrode assembly for solid polymer electrolyte fuel cells according to claim 1, wherein the polymer has an ion exchange capacity of 0.3 to 5 meq/g.

10. The membrane electrode assembly for solid polymer electrolyte fuel cells according to claim 1, wherein the polymer has a weight average molecular weight of 10,000 to 1,000,000.

* * * * *

UNITED STATES PATENT AND TRADEMARK OFFICE
CERTIFICATE OF CORRECTION

PATENT NO. : 7,658,867 B2
APPLICATION NO. : 11/477611
DATED : February 9, 2010
INVENTOR(S) : Kanaoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this

Thirtieth Day of November, 2010

David J. Kappos
*Director of the United States Patent and Trademark Office*